United States Patent
Takagi et al.

(10) Patent No.: US 12,060,536 B2
(45) Date of Patent: Aug. 13, 2024

(54) DEFOAMING AGENT AND LUBRICATING OIL COMPOSITION

(71) Applicant: ENEOS CORPORATION, Tokyo (JP)

(72) Inventors: Akira Takagi, Tokyo (JP); Noriko Ayame, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/922,870

(22) PCT Filed: Jun. 4, 2021

(86) PCT No.: PCT/JP2021/021450
§ 371 (c)(1),
(2) Date: Nov. 2, 2022

(87) PCT Pub. No.: WO2021/251307
PCT Pub. Date: Dec. 16, 2021

(65) Prior Publication Data
US 2023/0159848 A1 May 25, 2023

(30) Foreign Application Priority Data
Jun. 8, 2020 (JP) .................. 2020-099505

(51) Int. Cl.
*C10M 157/10* (2006.01)
*C10M 145/14* (2006.01)
(Continued)

(52) U.S. Cl.
CPC ........ *C10M 157/10* (2013.01); *C10M 145/14* (2013.01); *C10M 145/16* (2013.01);
(Continued)

(58) Field of Classification Search
CPC ............ C10N 2070/00; C10N 2020/02; C10N 2030/02; C10N 2030/18; C10N 2020/04;
(Continued)

(56) References Cited

U.S. PATENT DOCUMENTS

2006/0264339 A1  11/2006  Devlin et al.
2018/0208870 A1   7/2018  Takagi et al.
(Continued)

FOREIGN PATENT DOCUMENTS

CN  107847821 A  3/2018
CN  107922872 A  4/2018
(Continued)

OTHER PUBLICATIONS

ISR issued in International Patent Application No. PCT/JP2021/021450, Aug. 17, 2021, translation.
(Continued)

*Primary Examiner* — Vishal V Vasisth
(74) *Attorney, Agent, or Firm* — GREENBLUM & BERNSTEIN P.L.C

(57) ABSTRACT

A defoaming agent obtainable by a process that includes: polymerizing (A) at least one polymerizable monomer in a composition, the composition comprising (C) a solvent and (B) at least one non-polymerizable polysiloxane dissolved in the (C) solvent, wherein the component (A) optionally comprises at least one Si-atom-containing monomer in an amount of less than 10 mass % on the basis of the total mass of the component (A).

9 Claims, 1 Drawing Sheet

(51) Int. Cl.
*C10M 145/16* (2006.01)
*C10M 155/02* (2006.01)
*C10M 169/04* (2006.01)
*C10N 20/04* (2006.01)
*C10N 30/18* (2006.01)
*C10N 70/00* (2006.01)

(52) U.S. Cl.
CPC ...... *C10M 155/02* (2013.01); *C10M 169/041* (2013.01); *C10M 2203/003* (2013.01); *C10M 2209/084* (2013.01); *C10M 2209/086* (2013.01); *C10M 2229/041* (2013.01); *C10M 2229/051* (2013.01); *C10N 2020/04* (2013.01); *C10N 2030/18* (2013.01); *C10N 2070/00* (2013.01)

(58) Field of Classification Search
CPC ............ C10N 2020/06; C10N 2060/14; C10N 2010/04; C10M 169/041; C10M 155/02; C10M 157/10; C10M 145/14; C10M 145/16; C10M 2229/051; C10M 2219/046; C10M 2203/003; C10M 2215/28; C10M 2203/1006; C10M 2205/028; C10M 2207/2805; C10M 2209/086; C10M 2205/04; C10M 2229/041; C10M 2209/084; B01D 19/0409; B01D 19/0427; B01D 19/04; B01D 19/0431

See application file for complete search history.

(56) References Cited

U.S. PATENT DOCUMENTS

| | | |
|---|---|---|
| 2018/0208871 A1 | 7/2018 | Takagi et al. |
| 2018/0223219 A1 | 8/2018 | Takagi et al. |
| 2019/0256790 A1 | 8/2019 | Takagi et al. |
| 2019/0390132 A1 | 12/2019 | Tatsumi et al. |

FOREIGN PATENT DOCUMENTS

| | | |
|---|---|---|
| EP | 0 970 969 A1 | 1/2000 |
| JP | 2000-087065 A | 3/2000 |
| JP | 2008-120889 A | 5/2008 |
| JP | 2013-095874 A | 5/2013 |
| WO | 2008/055998 A1 | 5/2008 |
| WO | 2017/030201 A1 | 2/2017 |
| WO | 2017/030202 A1 | 2/2017 |
| WO | 2017/030203 A1 | 2/2017 |
| WO | 2017/030204 A1 | 2/2017 |
| WO | 2018/155579 A1 | 8/2018 |

OTHER PUBLICATIONS

IPRP issued in International Patent Application No. PCT/JP2021/021450, Dec. 13, 2022, translation.

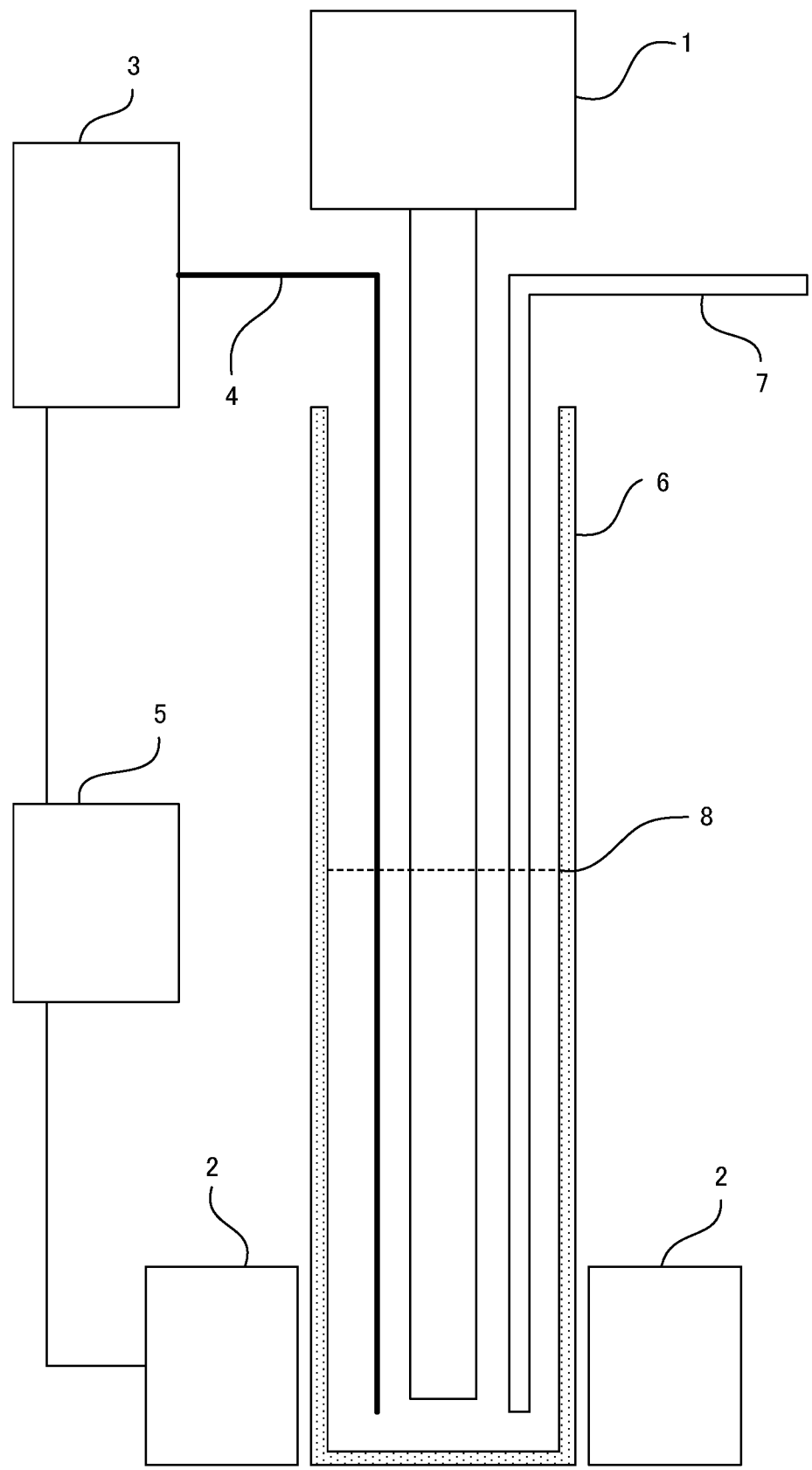

DEFOAMING AGENT AND LUBRICATING OIL COMPOSITION

This application is a 371 of PCT/JP2021/021450, filed Jun. 4, 2021.

FIELD

The present invention relates to a defoaming agent, and a lubricating oil composition containing the defoaming agent.

BACKGROUND

Lubricating oils are used in various kinds of machinery in order to improve the lubricity between members. Here, increased foaming of the lubricating oil may cause insufficient lubrication, hydraulic control failure, reduced cooling efficiency, etc. Thus, it is demanded to defoam the lubricating oil.

For example, recent improved performance and recent improved fuel efficiency of automobile engines, transmissions, and axle units make environments where lubricating oils are exposed therein severer. Their continuous high-load operations or high-speed driving increase(s) foaming in an engine oil, a transmission oil, or an axle unit oil, which causes, as a result, problems such as: hydraulic control failure due to the incorporation of foam into hydraulic circuits; impaired lubricating performance or reduced cooling efficiency due to foaming; wear and seizure due to the breakage of an oil film in a friction portion; and promoted deterioration of the lubricating oil due to an oil temperature increase. Thus, an engine oil, a transmission oil and an axle unit oil that keep defoaming performance high are demanded in order to defoam the oils for a long time since the initial stage of the operation.

Generally, a lubricating oil contains a base oil, and various additives incorporated according to desired characteristics. An example of the additives is a deforming agent for defoaming a lubricating oil. As a defoaming agent, a polysiloxane defoaming agent (silicone defoaming agent) is conventionally known. For example, Patent Literature 1 describes a lubricating oil composition incorporating (a) a polydimethylsiloxane having a kinematic viscosity at 25° C. of 300,000 to 1,500,000 mm²/s, and (b) a fluorinated polysiloxane having a kinematic viscosity at 25° C. of 500 to 9,000 mm²/s. Patent Literature 2 describes that a polydimethylsiloxane having a specific molecular weight distribution is incorporated into a lubricating oil for obtaining defoaming effect on foam generated by high-speed stirring.

CITATION LIST

Patent Literature

Patent Literature 1: JP 2000-87065 A
Patent Literature 2: JP 2008-120889 A
Patent Literature 3: WO 2017/030201 A1
Patent Literature 4: WO 2017/030202 A1
Patent Literature 5: WO 2017/030203 A1
Patent Literature 6: WO 2017/030204 A1
Patent Literature 7: WO 2018/155579 A1

SUMMARY

Technical Problem

Generally, a defoaming agent exhibits its defoaming performance in its finely dispersed state in a lubricating oil composition. However, a conventional lubricating oil containing a silicone defoaming agent compound is likely to suffer precipitation and unevenness of a silicone defoaming agent in concentration during long-term storage in a bottle or long-term use in machinery, which causes the defoaming performance to gradually disappear in course of time, to increase the foaming of the lubricating oil, which is problematic. For example, a torque converter included in an automatic transmission, or a pulley included in a metal belt-type continuously variable transmission has a position where a very great centrifugal effect occurs. When a lubricating oil is supplied to such a position, a silicone defoaming agent compound used as a defoaming agent is separated by such a centrifugal effect, and concentrates in a specific position of the machinery, which reduces the concentration of the defoaming agent in the lubricating oil circulating in the machinery, and thus, increases the foaming of the lubricating oil.

An object of the present invention is to provide a defoaming agent that can prevent defoaming performance from impairing even during long-term storage, and that can keep the deforming performance of a lubricating oil for a long time even under such a lubricating condition that a high centrifugal effect occurs to the lubricating oil. A lubricating oil composition containing this defoaming agent is also provided.

Solution to Problem

The present invention encompasses the following aspects [1] to [10].

[1] A defoaming agent obtainable by a process, the process comprising:
polymerizing (A) at least one polymerizable monomer in a composition, the composition comprising (C) a solvent and (B) at least one non-polymerizable polysiloxane dissolved in the (C) solvent,
wherein the component (A) optionally comprises at least one Si-atom-containing monomer in an amount of less than 10 mass % on the basis of the total mass of the component (A).

[2] The defoaming agent according to [1],
wherein the component (A) does not comprise the Si-atom-containing monomer.

[3] The defoaming agent according to [1] or [2],
wherein the component (A) comprises at least one monomer represented by the following general formula (1):

$$Q^1\text{-}Z^1\text{—}Y^1 \qquad (1)$$

wherein in the general formula (1), $Q^1$ is a polymerizable functional group; $Y^1$ is a substituted or unsubstituted C1-40 hydrocarbyl group; and $Z^1$ is a linking group linking $Q^1$ and $Y^1$ or a single bond.

[4] The defoaming agent according to any one of [1] to [3],
wherein the component (A) comprises at least one monomer selected from the group consisting of a (meth)acrylate ester, an α-olefin, and styrene.

[5] The defoaming agent according to any one of [1] to [4],
wherein the component (A) further comprises at least one multifunctional monomer having at least two polymerizable functional groups in a single molecule.

[6] The defoaming agent according to any one of [1] to [5],
wherein the component (B) comprises at least one polysiloxane represented by the following formula (2):

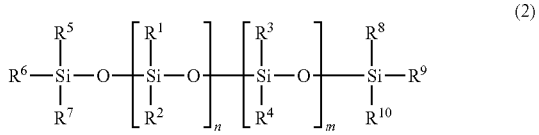

(2)

wherein in the general formula (2), polysiloxane repeating units may be in any order;
$R^1$ and $R^2$ are each independently a no-fluorine-atom-containing non-polymerizable C1-18 organic group;
$R^3$ and $R^4$ are each independently a fluorine-atom-containing non-polymerizable organic group, or a no-fluorine-atom-containing non-polymerizable C1-18 organic group, wherein at least one of $R^3$ and $R^4$ is a non-polymerizable organic group comprising no less than 3 fluorine atoms;
$R^5$, $R^6$, $R^7$, $R^8$, $R^9$, and $R^{10}$ are each independently a non-polymerizable C1-18 organic group;
n and m are each independently an integer of no less than 0; n+m is no less than 1; and
a ratio m/(n+m) is 0 to 1.

[7] The defoaming agent according to [6],
wherein in the general formula (2), $R^1$ and $R^2$ are each independently a no-fluorine-atom-containing C1-6 saturated hydrocarbyl group, or a no-fluorine-atom-containing C6-10 aromatic hydrocarbyl group which may comprise one or more alkyl substituent;
$R^3$ and $R^4$ are each independently a fluorine-atom-containing non-polymerizable organic group, a no-fluorine-atom-containing C1-6 saturated hydrocarbyl group, or a no-fluorine-atom-containing C6-10 aromatic hydrocarbyl group which may comprise one or more alkyl substituent, wherein at least one of $R^3$ and $R^4$ is a non-polymerizable organic group comprising no less than 3 fluorine atoms; and
$R^5$, $R^6$, $R^7$, $R^8$, $R^9$, and $R^{10}$ are each independently a C1-6 saturated hydrocarbyl group, or a no-fluorine-atom-containing C6-10 aromatic hydrocarbyl group which may comprise one or more alkyl substituent.

[8] The defoaming agent according to [6] or [7],
wherein in the general formula (2), $R^1$ and $R^2$ are each independently a no-fluorine-atom-containing C1-3 alkyl group, or phenyl group;
$R^3$ and $R^4$ are each independently a fluorine-atom-containing non-polymerizable organic group, or a no-fluorine-atom-containing C1-3 alkyl group, or phenyl group, wherein at least one of $R^3$ and $R^4$ is a non-polymerizable organic group comprising no less than 3 fluorine atoms; and
$R^5$, $R^6$, $R^7$, $R^8$, $R^9$, and $R^{10}$ are each independently a C1-3 alkyl group, or phenyl group.

[9] The defoaming agent according to any one of [1] to [8],
wherein the component (B) has a weight average molecular weight of 5,000 to 500,000.

[10] A lubricating oil composition comprising:
a lubricant base oil; and
the defoaming agent as defined in any one of [1] to [9].

Advantageous Effects of Invention

The defoaming agent and the lubricating oil composition according to the present invention can prevent defoaming performance from impairing even during long-term storage, and can keep the deforming performance of a lubricating oil for a long time even under such a lubricating condition that a high centrifugal effect occurs to the lubricating oil.

BRIEF DESCRIPTION OF DRAWINGS

FIG. 1 illustrates the structure of a homogenizer test machine used for evaluating defoaming performance.

DETAILED DESCRIPTION OF EMBODIMENTS

Hereinafter the present invention will be described in detail. In the present description, an expression "A to B" concerning numeral values A and B shall mean "no less than A and no more than B" unless otherwise specified. In such an expression, if a unit is added only to the numeral value B, the same unit shall be applied to the numeral value A. A word "or" shall mean a logical sum unless otherwise specified. In the present description, an expression "$E_1$ and/or $E_2$" concerning elements $E_1$ and $E_2$ shall mean "$E_1$, or $E_2$, or the combination thereof"; and an expression "$E_1, \ldots, E_{N-1}$, and/or $E_N$" concerning elements $E_1, \ldots, E_N$ (N is an integer of 3 or more) shall mean "$E_1, \ldots, E_{N-1}$, or $E_N$, or any combination thereof". An expression "Ci-j" (i and j are positive integers, and i<j) concerning an organic group shall mean "the carbon number is no less than i and no more than j".

In the present description, "(meth)acrylate" means "acrylate and/or methacrylate"; and "(meth)acryl" means "acryl and/or methacryl".

<1. Defoaming Agent>

A first aspect of the present invention is a defoaming agent obtainable by a process, the process comprising: polymerizing (A) at least one polymerizable monomer (hereinafter may be simply referred to as "monomer" or "component (A)") in a composition, the composition comprising (C) a solvent (hereinafter may be referred to as "polymerization solvent") and (B) at least one non-polymerizable polysiloxane (hereinafter may be referred to as "coexisting polysiloxane" or "component (B)") dissolved in the (C) solvent.

(Polymerization Reaction)

As the polymerization reaction, a known reaction of polymerization in a solvent such as radical polymerization, cationic polymerization, anionic polymerization, coordination polymerization, living radical polymerization, living cationic polymerization, living anionic polymerization, and living coordination polymerization may be employed. The polymerization reaction may be chain polymerization, and may be living polymerization. The chain polymerization may be addition polymerization, and may be ring-opening polymerization. Among them, radical polymerization (that may be living polymerization) or coordination polymerization (that may be living polymerization) may be preferably employed, and conventional radical polymerization may be particularly preferably employed. The polymerization reaction is conducted in a reaction system of, for example, dispersion polymerization, suspension polymerization, miniemulsion polymerization, microemulsion polymerization, emulsion polymerization, and solution polymerization. Among them, solution polymerization may be especially preferably employed.

((A) Monomer)

As the component (A), one monomer may be used alone, or two or more monomers may be used in combination. The component (A) preferably comprises at least one monomer represented by the following general formula (1):

$$Q^1\text{-}Z^1\text{—}Y^1 \tag{1}$$

wherein in the general formula (1), $Q^1$ is a polymerizable functional group; $Y^1$ is a substituted or unsubstituted C1-40 hydrocarbyl group; and $Z^1$ is a linking group linking $Q^1$ and $Y^1$ or a single bond.

As $Q^1$, any polymerizable functional group that causes a desired polymerization reaction may be used. Examples of $Q^1$ include groups such as vinyl groups and isopropenyl groups which each have an ethylenically unsaturated bond and cause an addition polymerization reaction, and groups such as epoxy groups which cause a ring-opening polymerization reaction.

$Y^1$ is a substituted or unsubstituted C1-40 hydrocarbyl group. Examples of unsubstituted hydrocarbyl groups include alkyl groups (including those each having a ring structure), alkenyl groups (each having a double bond in random position, and including those each having a ring structure), aryl groups (including those each having an alkyl or alkenyl group), arylalkyl groups, and arylalkenyl groups.

Examples of the alkyl groups include various linear or branched chain alkyl groups. Examples of ring structures that the alkyl groups may have include C5-7 cycloalkyl groups such as cyclopentyl group, cyclohexyl group, and cycloheptyl group. A chain hydrocarbyl substituent, if any, is in random position on the ring structure.

Examples of the alkenyl groups include various linear or branched chain alkenyl groups. Examples of ring structures that the alkenyl groups may have include the above described cycloalkyl groups, and C5-7 cycloalkenyl groups such as cyclopentenyl group, cyclohexenyl group, and cycloheptenyl group. A chain hydrocarbyl substituent, if any, is in random position on the ring structure.

Examples of the aryl groups include phenyl group and naphthyl group. In each of the alkylaryl groups, the alkenylaryl groups, the arylalkyl groups, and the arylalkenyl groups, a substituent is in random position on an aromatic ring.

An unsubstituted hydrocarbyl group as $Y^1$ is preferably an aliphatic hydrocarbyl group, more preferably a chain aliphatic hydrocarbyl group, and further preferably an alkyl group.

$Y^1$ may be an unsubstituted hydrocarbyl group, may be a substituted hydrocarbyl group, or may be a combination of unsubstituted and substituted hydrocarbyl groups. One preferred example of a substituted hydrocarbyl group as $Y^1$ is groups each obtained by substituting at least one hydrogen atom of an unsubstituted hydrocarbyl group (preferably an aliphatic hydrocarbyl group, more preferably a chain aliphatic hydrocarbyl group, and especially preferably an alkyl group. The same will be applied in this paragraph.) with a heteroatom-containing group (that is preferably oxygen, nitrogen, sulfur, or any combination thereof); substituting at least one methylene group (—$CH_2$— group) of an unsubstituted hydrocarbyl group with an ether bond (—O— group), a secondary amino group (—NH— group), or a thioether bond (—S— group); substituting at least one methine group (>CH— group) of an unsubstituted hydrocarbyl group with a tertiary amino group (>N— group); or any combination of those substitutions. The number of heteroatoms that such $Y^1$ has is preferably 1 to 3. Other preferred examples of a substituted hydrocarbyl group as $Y^1$ include polyether groups, fluoroalkyl groups, and fluoroalkyl (poly)ether groups.

Preferred examples of the heteroatom-containing group include hydroxy group; mercapto group; primary amino group; amine residues each having 1 to 2 nitrogen atoms and 0 to 2 oxygen atoms such as dimethylamino group, diethylamino group, dipropylamino group, dibutylamino group, anilino group, toluidino group, xylidino group, acetylamino group, and benzoylamino group; heterocyclic residues each having 1 to 2 nitrogen atoms and 0 to 2 oxygen atoms such as morpholino group, pyrrolyl group, pyrrolino group, pyridyl group, methylpyridyl group, pyrrolidinyl group, piperidinyl group, piperidino group, quinolyl group, pyrrolidonyl group, pyrrolidono group, imidazolino group, and pyrazinyl group; and C2-5 cyclic ether residues such as epoxy group, oxetanyl group, tetrahydrofuranyl group, and tetrahydropyranyl group.

Preferred examples of polyether groups include groups represented by the following general formula (3):

wherein in the general formula (3), $R^{11}$ is a C2-4, preferably a C2-3 alkylene group, a plurality of $R^{11}$ may be the same as, or may be different from each other; a is an integer of no less than 2 which makes the carbon number of the general formula (3) no more than 40; and $R^{12}$ is a hydrogen atom or a C1-5 alkyl group.

Preferred examples of fluoroalkyl groups include C1-4 perfluoroalkyl groups; groups represented by the following general formula (4); groups represented by the following general formula (5); 1,1,1,3,3,3-hexafluoro-2-propyl group; 2,2-bis(trifluoromethyl)propyl group; perfluorocyclohexylmethyl group; pentafluorobenzyl group; 2,3,5,6-tetrafluorophenyl group; 2,2,2-trifluoro phenyl-1-(trifluoromethyl)ethyl group; and 3-(trifluoromethyl)benzyl group:

wherein in the general formula (4), E is a fluorine atom or hydrogen atom; p is an integer of 1 to 6; q is an integer of 1 to 15; and when q is 1, E is a fluorine atom.

In the general formula (4), q is preferably no more than 8 in view of easily preventing deforming performance from impairing, which is induced by the solidification of the polymer. In one embodiment, q can be 1 to 8.

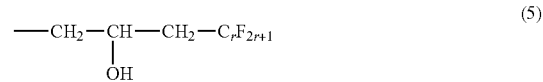

wherein in the general formula (5), r is an integer of 2 to 9.

In the general formula (5), r is preferably no less than 4 in view of improving defoaming performance; preferably no more than 8 in view of easily preventing the deforming performance from impairing, which is induced by the solidification of the polymer; and in one embodiment, can be 4 to 8.

Examples of C1-4 perfluoroalkyl groups include trifluoromethyl group, perfluoroethyl group, perfluoropropyl group, perfluoroisopropyl group, and perfluoro-tert-butyl group.

Examples of groups represented by the general formula (4) include 2,2,2-trifluoroethyl group; 3,3,3-trifluoropropyl group; 1H,1H,3H-hexafluorobutyl group; 2-(perfluorobutyl)ethyl group; 3-(perfluorobutyl)propyl group; 6-(perfluorobutyl)hexyl group; 2-(perfluoro-5-methylhexyl)ethyl group; 2-(perfluoro-7-methyloctyl)ethyl group; 4,4,5,5,5-pentafluoropentyl group; 2-(perfluorohexyl)ethyl group; 2-(perfluorooctyl)ethyl group; 3-(perfluorohexyl)propyl group; 3-(perfluorooctyl)propyl group; 1H,1H,3H-tetrafluoropropyl group; 1H,1H,5H-octafluoropentyl group; 1H,1H,7H-dodecafluoroheptyl group; 1H,1H,9H-hexadecafluorononyl group; 6-(perfluoro-1-methylethyl)hexyl group; 1H,1H-(3,5,5-tris(trifluoromethyl))octafluorohexyl group; 1H,1H,11H-eicosafluoroundecyl group; 2-(perfluoro-3-methylbutyl)ethyl group; 1H,1H-perfluoropropyl group; 1H,1H-perfluorobutyl group; 1H,1H-perfluoropentyl group; 1H,1H-perfluorohexyl group; 1H,1H-perfluoroheptyl group; 1H,1H-perfluorooctyl group; 1H,1H-perfluorononyl group; 1H,1H-perfluorodecyl group; 1H,1H-perfluoroundecyl group; 1H,1H-perfluorododecyl group; 1H,1H-perfluorotetradecyl group; 1H,1H-perfluorohexadecyl group; 1H,1H-perfluoro-3,7-dimethyloctyl group; 2-(perfluorodecyl)ethyl group; 2-(perfluorododecyl)ethyl group; and 2-(perfluoro-9-methyldecyl)ethyl group.

Examples of groups represented by the general formula (5) include 3-(perfluorobutyl)-2-hydroxypropyl group; 3-(perfluoro-3-methylbutyl)-2-hydroxypropyl group; 3-(perfluorooctyl)-2-hydroxypropyl group; 3-(perfluoro-5-methylhexyl)-2-hydroxypropyl group; and 3-(perfluoro-7-methyloctyl)-2-hydroxypropyl group.

Preferred examples of fluoroalkyl (poly)ether groups include groups represented by the following general formula (6); 2-[(perfluoropropanoyl)oxy]ethyl group; and fluoropolyether groups each comprising a perfluoropolyethylene oxide group, a perfluoropolypropylene oxide group, or a perfluoropolyoxetane group, and fluoropolyether copolymer groups thereof:

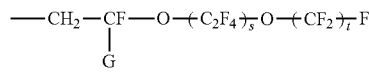

(6)

wherein in the general formula (6), G is a fluorine atom or a trifluoromethyl group; s is an integer of 0 to 2; and t is an integer of 1 to 4.

Examples of groups represented by the general formula (6) include 1H,1H-perfluoro-3,6-dioxadecyl group; 1H,1H-perfluoro-3,6,9-trioxadecyl group; 1H,1H-perfluoro-3,6,9-trioxatridecyl group; 2-perfluoropropoxy-2,3,3,3-tetrafluoropropyl group; and 1H,1H-perfluoro-2,5-dimethyl-3,6-dioxanonyl group.

Among the above-described groups, any group represented by the general formula (4) may be especially preferably used as a substituted hydrocarbyl group having a fluorine atom.

The carbon number of $Y^1$ is 1 to 40; and in one embodiment, can be 1 to 5, or 6 to 18, or 19 to 40, or 19 to 36, or 19 to 24.

$Z^1$ is a linking group linking $Q^1$ and $Y^1$ or a single bond. The linking group is not particularly limited as long as the linking group can link $Q^1$ and $Y^1$. Examples of the linking group include —O— group, —S— group, >NH group, >NR' group (R' is a C1-40 hydrocarbyl group), —C(O)— group, —C(S)— group, —C(O)O— group, —C(O)S— group, —C(S)O— group, —C(S)S— group, —C(O)NH— group, —C(O)NR'— group (R' is a C1-40 hydrocarbyl group), —C(S)NH— group, —C(S)NR'— group (R' is a C1-40 hydrocarbyl group), —C(O)NHC(O)— group, —C(O)NR'C(O)— group (R' is a C1-40 hydrocarbyl group), —S(O)— group, —S(O)$_2$— group, —S(O)$_2$O— group, —P(O)(OH)O— group, —P(O)(OR')O— group (R' is a C1-40 hydrocarbyl group), —OPH(O)O— group (encompassing a tautomer), —OP(OR')O— group (R' is a C1-40 hydrocarbyl group), —OP(O)(OH)O— group, and —OP(O)(OR')O— group (R' is a C1-40 hydrocarbyl group). The carbon number of $Z^1$ (the carbon number of R' is added thereto when $Z^1$ has R') is no less than 0, preferably 0 to 6, more preferably 0 to 5; and in one embodiment, can be 0 to 3.

In one embodiment, the component (A) preferably comprises at least one monomer selected from the group consisting of a (meth)acrylate ester, an α-olefin, and styrene. In one embodiment, such a monomer can fall under monomers represented by the general formula (1). In a (meth)acrylate ester, $Q^1$ is a vinyl group or 1-methylvinyl group (isopropenyl group), $Y^1$ is a substituted or unsubstituted hydrocarbyl group, and $Z^1$ is an ester bond. In an α-olefin, $Q^1$ is a vinyl group, $Y^1$ is an alkyl group, and $Z^1$ is a single bond. In styrene, $Q^1$ is a vinyl group, $Y^1$ is phenyl group, and $Z^1$ is a single bond.

As the (meth)acrylate ester, for example, at least one (meth)acrylate ester selected from (meth)acrylate esters represented by the general formula (7) (hereinafter may be referred to as "(meth)acrylate monomer (M-1)"), (meth)acrylate esters represented by the general formula (8) (hereinafter may be referred to as "(meth)acrylate monomer (M-2)"), and (meth)acrylate esters represented by the general formula (9) (hereinafter may be referred to as "(meth)acrylate monomer (M-3)") may be used:

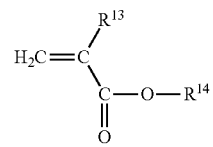

(7)

wherein in the general formula (7), $R^{13}$ represents a hydrogen atom or a methyl group, and $R^{14}$ represents a linear or branched chain C1-5 hydrocarbon group, preferably alkyl group.

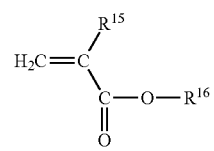

(8)

wherein in the general formula (8), $R^{15}$ represents a hydrogen atom or a methyl group, and $R^{16}$ represents a linear or branched chain C6-18 hydrocarbon group, preferably alkyl group.

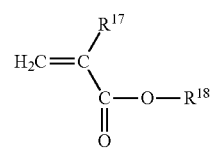

(9)

wherein in the general formula (9), $R^{17}$ represents a hydrogen atom or a methyl group, and $R^{18}$ represents a linear or branched chain hydrocarbon group, preferably alkyl group having a carbon number of no less than 19.

$R^{18}$ in the (meth)acrylate monomer (M-3) represented by the general formula (9) is a linear or branched chain hydrocarbon group having a carbon number of no less than 19; and in one embodiment, can be a linear or branched chain C19-50,000 hydrocarbon group, or a linear or branched chain C19-500 hydrocarbon group, or a linear or branched chain C19-100 hydrocarbon group, or a branched chain C19-50 hydrocarbon group, or a branched chain C19-40 hydrocarbon group. The hydrocarbon group is preferably an alkyl group.

In one embodiment, the component (A) can comprise at least one (meth)acrylate ester. In one embodiment, the content of the (meth)acrylate ester in the component (A) is preferably in an amount of no less than 50 mass %, or no less than 60 mass %, or no less than 75 mass %, or no less than 90 mass %, and may be in an amount of 100 mass %, on the basis of the total mass of the component (A).

In one embodiment, the component (A) can comprise at least one (meth)acrylate monomer (M-2). In one embodiment, the content of the (meth)acrylate monomer (M-2) in the component (A) is preferably in an amount of no less than 50 mass %, or no less than 60 mass %, or no less than 75 mass %, or no less than 90 mass %, and may be in an amount of 100 mass %, on the basis of the total mass of the component (A).

In one embodiment, the component (A) can comprise a monomer (M-4) represented by the general formula (10) (hereinafter may be referred to as "monomer (M-4)"), or a monomer (M-5) represented by the general formula (11) (hereinafter may be referred to as "monomer (M-5)"), or any combination thereof. In one embodiment, the monomer(s) (M-4) and/or (M-5) can be used in combination with at least one monomer selected from the (meth)acrylate monomers (M-1) to (M-3):

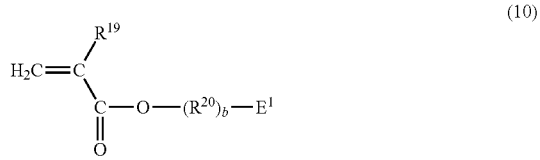
(10)

wherein in the general formula (10), $R^{19}$ represents a hydrogen atom or a methyl group, $R^{20}$ represents a C1-18 alkylene group, $E^1$ represents an amine residue or heterocyclic residue having 1 to 2 nitrogen atom(s), and 0 to 2 oxygen atom(s), and b represents 0 or 1.

Examples of the C1-18 alkylene group represented by $R^{20}$ include ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group (these alkylene groups may be each a linear or branched chain).

Examples of the residue represented by $E^1$ include dimethylamino group, diethylamino group, dipropylamino group, dibutylamino group, anilino group, toluidino group, xylidino group, acetylamino group, benzoylamino group, morpholino group, pyrrolyl group, pyrrolino group, pyridyl group, methylpyridyl group, pyrrolidinyl group, pyrrolidino group, piperidinyl group, piperidino group, quinolyl group, pyrrolidonyl group, pyrrolidono group, imidazolino group, and pyrazinyl group.

(11)

wherein in the general formula (11), $R^{21}$ represents a hydrogen atom or a methyl group, and $E^2$ represents an amine residue or heterocyclic residue having 1 to 2 nitrogen atom(s), and 0 to 2 oxygen atom(s).

Examples of the residue represented by $E^2$ include dimethylamino group, diethylamino group, dipropylamino group, dibutylamino group, anilino group, toluidino group, xylidino group, acetylamino group, benzoylamino group, morpholino group, pyrrolyl group, pyrrolino group, pyridyl group, methylpyridyl group, pyrrolidinyl group, pyrrolidino group, piperidinyl group, piperidino group, quinolyl group, pyrrolidonyl group, pyrrolidono group, imidazolino group, and pyrazinyl group.

Preferred examples of the monomers (M-4) and (M-5) include dimethylaminomethyl methacrylate, diethylaminomethyl methacrylate, dimethylaminoethyl methacrylate, diethylaminoethyl methacrylate, 2-methyl-5-vinylpyridine, morpholinomethyl methacrylate, morpholinoethyl methacrylate, N-vinylpyrrolidone, and mixtures thereof.

In one embodiment, the content of the monomers (M-4) and (M-5) in total in the component (A) can be preferably in an amount of no more than 25 mass %, or no more than 15 mass %, or no more than 10 mass %, on the basis of the total mass of the component (A).

As an α-olefin, for example, a C3-18 α-olefin may be preferably used. In one embodiment, the carbon number of the α-olefin can be 3 to 12.

Other examples of monomers that the component (A) can comprise include ethylene, (meth)acrylonitrile, vinylpyridine, vinyl acetate, vinyl halides, maleic anhydride, and fumaric acid diester.

Other examples of monomers represented by the general formula (1) include α-olefin epoxides.

The content of the Si-atom-containing monomer in the component (A) (in total when the component (A) comprises two or more Si-atom-containing monomers) is in an amount of less than 10 mass %, preferably in an amount of less than 5 mass %, and more preferably in an amount of less than 3 mass %, and may be in art amount of 0 mass %, on the basis of the total mass of the component (A). Example of the Si-atom-containing monomer include monomers represented by the general formula (1) wherein $Y^1$ comprises any silyl substituent such as a trialkylsilyl group.

As the component (A), at least one monomer having only one polymerizable functional group in a single molecule (monofunctional monomer) may be used alone; and at least one monomer having at least two polymerizable functional groups in a single molecule (multifunctional monomer), and a monofunctional monomer may be used in combination. The particle size of the obtained defoaming agent can be controlled by the component (A) further comprising a multifunctional monomer in addition to a monofunctional monomer. Examples of the multifunctional monomer include esters of (meth)acrylic acid and a C2-12 saturated chain aliphatic polyhydric alcohol, a C5-12 saturated alicyclic polyhydric alcohol, or a C6-12 aromatic polyhydric alcohol, such as ethylene glycol di(meth)acrylate, trimethylolpropane tri(meth)acrylate, and pentaerythritol tetra(meth)acrylate; di(meth)acrylate esters of poly (or oligo)alkylene glycols; and divinyl benzene.

In one embodiment, the content of the monomer represented by the general formula (1) in the component (A) is preferably in an amount of no less than 50 mass %, or no less than 60 mass %, or no less than 75 mass %, or no less than 90 mass %, and may be in an amount of 100 mass %, on the basis of the total mass of the component (A).

In one embodiment, in view of further preventing defoaming performance from impairing during storage and in view of further improving the resistance to centrifugal force, the component (A) preferably comprises at least one monomer represented by the general formula (1) wherein $Y^1$ is a C6-40 alkyl group, and the content thereof is preferably in an amount of no less than 50 mass %, or no less than 60 mass %, or no less than 75 mass %, or no less than 90 mass %, and may be in an amount of 100 mass %, on the basis of the total mass of the component (A). In one embodiment, from the same viewpoints, the component (A) preferably comprises at least one monomer represented by the general formula (1) wherein $Y^1$ is a C8-40 alkyl group, and the content thereof is preferably in an amount of no less than 50 mass %, or no less than 60 mass %, or no less than 75 mass %, or no less than 90 mass %, and may be in an amount of 100 mass %, on the basis of the total mass of the component (A).

In one embodiment, from the same viewpoints and in view of further improving defoaming performance, the component (A) preferably comprises at least one monomer represented by the general formula (1) wherein $Y^1$ is a C6-18 alkyl group, and the content thereof is preferably in an amount of no less than 50 mass %, or no less than 60 mass %, or no less than 75 mass %, or no less than 90 mass %, and may be in an amount of 100 mass %, on the basis of the total mass of the component (A). In one embodiment, from the same viewpoints, the component (A) preferably comprises at least one monomer represented by the general formula (1) wherein $Y^1$ is a C8-18 alkyl group, and the content thereof is preferably in an amount of no less than 50 mass %, or no less than 60 mass %, or no less than 75 mass %, or no less than 90 mass %, and may be in an amount of 100 mass %, on the basis of the total mass of the component (A).

In one embodiment, the content of the multifunctional monomer in the component (A) is preferably in an amount of 0 to 50 mass %, or 0 to 40 mass %, or 0 to 25 mass %, or 0 to 10 mass %, and may be in an amount of 0 mass %, on the basis of the total mass of the component (A).

((B) Coexisting Polysiloxane)

The component (B) is a non-polymerizable polysiloxane. Such a polysiloxane is commercially available as a silicone defoaming agent or a fluorosilicone defoaming agent. As the component (B), a polysiloxane having a structure represented by the following general formula (2) may be used. As the component (B), one polysiloxane may be used alone, or two or more polysiloxanes may be used in combination.

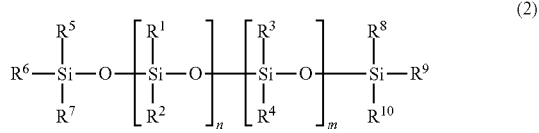

(2)

wherein in the general formula (2), polysiloxane repeating units may be in any order; $R^1$ and $R^2$ are each independently a no-fluorine-atom-containing non-polymerizable C1-18 organic group; $R^3$ and $R^4$ are each independently a fluorine-atom-containing non-polymerizable organic group, or a no-fluorine-atom-containing non-polymerizable C1-18 organic group, wherein at least one of $R^3$ and $R^4$ is a non-polymerizable organic group comprising no less than 3 fluorine atoms; $R^5$, $R^6$, $R^7$, $R^8$, $R^9$, and $R^{10}$ are each independently a non-polymerizable C1-18 organic group; n and m are each independently an integer of no less than 0; n+m is no less than 1; and the ratio m/(n+m) is 0 to 1.

In the general formula (2), examples of a non-polymerizable C1-18 organic group include substituted or unsubstituted alkyl groups, substituted or unsubstituted phenyl groups, fluoroalkyl groups, and polyether groups. Examples of substituents in substituted alkyl groups and substituted phenyl groups include hydroxy groups, amino groups, ether bonds, and ester bonds. The carbon numbers of $R^5$ to $R^{10}$ are each 1 to 18; in one embodiment, can be 1 to 12; and in another embodiment, can be 1 to 6. Preferred examples of this organic group include methyl group, phenyl group, and fluoroalkyl group. Especially preferred examples among them include methyl group and fluoroalkyl group.

In the general formula (2), examples of a no-fluorine-atom-containing non-polymerizable C1-18 organic group include: substituted or unsubstituted alkyl groups, substituted or unsubstituted phenyl groups, and polyether groups. Examples of substituents in substituted alkyl groups and substituted phenyl groups include hydroxy groups, amino groups, ether bonds, and ester bonds. The carbon number of this organic group is 1 to 18; in one embodiment, 1 to 12; and in another embodiment, 1 to 6. Preferred examples of this organic group include methyl group and phenyl group. An especially preferred example among them is methyl group.

In the general formula (2), examples of a non-polymerizable organic group comprising one or two fluorine atom(s) include substituted alkyl groups and substituted phenyl groups each comprising one or two fluoro group(s). The carbon number of the non-polymerizable organic group comprising one or two fluorine atom(s) is preferably 1 to 18; in one embodiment, can be 1 to 12; and in another embodiment, can be 1 to 6.

In the general formula (2), as an organic group comprising no less than 3 fluorine atoms (fluorinated organic group), a fluoroalkyl group or a fluoroalkyl (poly)ether group may be preferably used.

The number of fluorine atoms in the fluorinated organic group is preferably no less than 3 in view of improving defoaming performance; and is preferably no more than 17 in view of easily preventing deforming performance from impairing, which is induced by the solidification of the polymer.

The group same as any of the fluoroalkyl groups described above concerning $Y^1$ in the general formula (1) may be used as a fluoroalkyl group, and preferred examples of this fluoroalkyl group are also the same as described above. The group same as any of the fluoroalkyl (poly)ether groups described above concerning $Y^1$ in the general formula (1) may be used as a fluoroalkyl (poly)ether group, and preferred examples of this fluoroalkyl (poly)ether group are also the same as described above.

Among the above-described groups, any group represented by the general formula (4) may be especially preferably used as the fluorinated organic group.

In the component (B), the ratio (($\Sigma$m)/$\Sigma$(n+m))) (hereinafter may be referred to as "average fluorination ratio of the polysiloxane structure") of the total number of the polysiloxane repeating units each comprising fluorine atoms (—O—SiR$^3$R$^4$—) ($\Sigma$m where $\Sigma$ means the sum of the polysiloxane repeating units of all the polysiloxane structures in the component (B)) to the total number of all the polysiloxane repeating units (—O—SiR$^1$R$^2$— repeating unit and —O—SiR$^3$R$^4$— repeating unit: refer to the general formula (2)) ($\Sigma$(n+m) where $\Sigma$ means the sum of the polysiloxane repeating units of all the polysiloxane structures in the component (B)) is 0 to 1; and in one embodiment, can be 0.01 to 1, or 0.05 to 1, or 0.10 to 1 in view of further improving defoaming performance after shearing. When the component (B) comprises plural polysiloxanes in combination, the average fluorination ratio of the polysiloxane structure in each of these plural polysiloxanes is preferably within the above range.

In one embodiment, the weight average molecular weight of the component (B) is preferably no less than 5,000, more preferably no less than 10,000, and further preferably no less than 15,000 in view of further improving defoaming performance; is preferably no more than 500,000, more preferably no more than 400,000, and further preferably no more than 300,000 in view of further reducing the viscosity to improve dispersibility, and thereby, further improving the lifetime of the defoaming agent; and in one embodiment, can be 5,000 to 500,000, or 10,000 to 400,000, or 15,000 to 300,000.

In the present description, weight average molecular weight means weight average molecular weight in terms of polystyrene which is measured by gel permeation chromatography (GPC) using polystyrene as a standard material. The measurement conditions for GPC are as follows.

[GPC Measurement Conditions]
device: ACQUITY™ APC UV RI System manufactured by Waters Corporation
column: two columns of ACQUITY™ APC XT900A manufactured by Waters Corporation (gel particle size: 2.5 µm, column size (inner diameter×length): 4.6 mm×150 mm); and one column of ACQUITY™ APC XT200A manufactured by Waters Corporation (gel particle size: 2.5 µm, column size (inner diameter× length): 4.6 mm×150 mm), connected in series in this order from the upstream side
column temperature: 40° C.
sample solution: tetrahydrofuran solution having a sample concentration of 1.0 mass %
eluent: tetrahydrofuran
solution injection volume: 20.0 µL
detector: differential refractometer
standard material: standard polystyrene (Agilent Easi-Cal™ PS-1 manufactured by Agilent Technologies, Inc.), 8 points (molecular weight: 2698000, 597500, 290300, 133500, 70500, 30230, 9590 and 2970)

If the weight average molecular weight measured based on the above conditions is less than 10000, the columns and the standard material are changed according to the following conditions, and then, the weight average molecular weight is measured again.
column: one column of ACQUITY™ APC XT125A manufactured by Waters Corporation (gel particle size: 2.5 µm, column size (inner diameter×length): 4.6 mm×150 mm); and two columns of ACQUITY™ APC XT45A manufactured by Waters Corporation (gel particle size: 1.7 µm, column size (inner diameter×length): 4.6 mm×150 mm), connected in series in this order from the upstream side
standard material: standard polystyrene (Agilent Easi-Cal™ PS-1 manufactured by Agilent Technologies, Inc.), 10 points (molecular weight: 30230, 9590, 2970, 890, 786, 682, 578, 474, 370 and 266)

In one embodiment, the weight average molecular weight of the component (B) is preferably no less than $M_{L1}(x)$, more preferably no less than $M_{L2}(x)$, and further preferably no less than $M_{L3}(x)$ in view of further improving defoaming performance; and is preferably no more than $M_{U1}(x)$, more preferably no more than $M_{U2}(x)$, and further preferably no more than $M_{U3}(x)$ in view of reducing the viscosity to improve dispersibility, and thereby, further improving the lifetime of the defoaming agent; and in one embodiment, can be $M_{L1}(x)$ to $M_{U1}(x)$, or $M_{L2}(x)$ to $M_{U2}(x)$, or $M_{L3}(x)$ to $M_{U3}(x)$. x represents the average fluorination ratio of the polysiloxane structure in the component (B); and $M_{L1}(x)$, $M_{L2}(x)$, $M_{L3}(x)$, $M_{U1}(x)$, $M_{U2}(x)$ and $M_{U3}(x)$ are functions of x which are defined in the following equations (1) to (6), respectively. When the component (B) comprises plural polysiloxanes in combination, the weight average molecular weight of each of these plural polysiloxanes is preferably within the above range corresponding to the average fluorination ratio x of each of the polysiloxanes.

$$M_{L1}(x) = \begin{cases} 9.952 \times 10^{10} \times (0.1 - x)^{6.6} + 5000, & 0 \le x < 0.1 \\ 5000, & 0.1 \le x \le 1 \end{cases} \quad (1)$$

$$M_{L2}(x) = \begin{cases} 15.924 \times 10^{10} \times (0.1 - x)^{6.6} + 10000, & 0 \le x < 0.1 \\ 10000, & 0.1 \le x \le 1 \end{cases} \quad (2)$$

$$M_{L3}(x) = \begin{cases} 29.85 \times 10^{10} \times (0.1 - x)^{6.6} + 15000, & 0 \le x < 0.1 \\ 15000, & 0.1 \le x \le 1 \end{cases} \quad (3)$$

$$M_{U1}(x) = \begin{cases} 139.34 \times 10^{10} \times (0.1 - x)^{6.6} + 150000, & 0 \le x < 0.1 \\ 150000, & 0.1 \le x \le 1 \end{cases} \quad (4)$$

$$M_{U2}(x) = \begin{cases} 109.48 \times 10^{10} \times (0.1 - x)^{6.6} + 125000, & 0 \le x < 0.1 \\ 125000, & 0.1 \le x \le 1 \end{cases} \quad (5)$$

$$M_{U3}(x) = \begin{cases} 79.63 \times 10^{10} \times (0.1 - x)^{6.6} + 100000, & 0 \le x < 0.1 \\ 100000, & 0.1 \le x \le 1 \end{cases} \quad (6)$$

In one embodiment, the polymerization degree of the polysiloxane structure in the component (B) ((n+m) in the general formula (2)) is, in view of further improving defoaming performance, preferably no less than 10, more preferably no less than 20, and in one embodiment, no less than 30; in view of reducing the viscosity to improve dispersibility, and thereby, further improving the lifetime of the defoaming agent, is preferably no more than 3,500; and in one embodiment, can be 10 to 3,500, or 20 to 3,500, or 30 to 3,500. When the component (B) comprises plural polysiloxanes in combination, the polymerization degree of each of these plural polysiloxanes is preferably within the above range.

In one embodiment, the polymerization degree of the polysiloxane structure in the component (B) ((n+m) in the general formula (2)) is preferably no less than $D_{L1}(x)$, more preferably no less than $D_{L2}(x)$, and further preferably no less than $D_{L3}(x)$ in view of further improving defoaming performance; is preferably no more than $D_{U1}(x)$, more preferably no more than $D_{U2}(x)$, and further preferably no more than $D_{U3}(x)$ in view of reducing the viscosity to improve dispersibility, and thereby, further improving the lifetime of the defoaming agent; and in one embodiment, can be $D_{L1}(x)$ to $D_{U1}(x)$, or $D_{L2}(x)$ to $D_{U2}(x)$, or $D_{L3}(x)$ to $D_{U3}(x)$. x represents the average fluorination ratio of the polysiloxane structure in the component (B); and $D_{L1}(x)$, $D_{L2}(x)$, $D_{L3}(x)$, $D_{U1}(x)$, $D_{U2}(x)$ and $D_{U3}(x)$ are functions of x which are defined in the following equations (7) to (12), respectively. When the component (B) comprises plural polysiloxanes in combination, the polymerization degree of each of these plural polysiloxanes is preferably within the above range corresponding to the average fluorination ratio x of each of the polysiloxanes.

$$D_{L1}(x) = \begin{cases} 7.564 \times 10^8 \times (0.1-x)^{6.6} + 10, & 0 \le x < 0.1 \\ 10, & 0.1 \le x \le 1 \end{cases} \quad (7)$$

$$D_{L2}(x) = \begin{cases} 13.137 \times 10^8 \times (0.1-x)^{6.6} + 20, & 0 \le x < 0.1 \\ 20, & 0.1 \le x \le 1 \end{cases} \quad (8)$$

$$D_{L3}(x) = \begin{cases} 22.69 \times 10^8 \times (0.1-x)^{6.6} + 30, & 0 \le x < 0.1 \\ 30, & 0.1 \le x \le 1 \end{cases} \quad (9)$$

$$D_{U1}(x) = \begin{cases} 99.53 \times 10^8 \times (0.1-x)^{6.6} + 1000, & 0 \le x < 0.1 \\ 1000, & 0.1 \le x \le 1 \end{cases} \quad (10)$$

$$D_{U2}(x) = \begin{cases} 99.53 \times 10^8 \times (0.1-x)^{6.6} + 1000, & 0 \le x < 0.1 \\ 1000, & 0.1 \le x \le 1 \end{cases} \quad (11)$$

$$D_{U3}(x) = \begin{cases} 117.45 \times 10^8 \times (0.1-x)^{6.6} + 550, & 0 \le x < 0.1 \\ 550, & 0.1 \le x \le 1 \end{cases} \quad (12)$$

((C) Polymerization Solvent)

As the component (C), a solvent in which the component (B) and the component (A) can dissolve, and which does not inhibit the polymerization reaction of the component (A) may be used. As the component (C), one solvent may be used alone, and two or more solvents may be used in combination. Preferred examples of the polymerization solvent include aliphatic hydrocarbons (such as hexane, heptane, octane, decane, cyclohexane, and methylcyclohexane), aromatic hydrocarbons (such as benzene, toluene, and xylene), ketones (such as acetone, methyl ethyl ketone, methyl isobutyl ketone, diisobutyl ketone, and cyclohexanone), esters (such as ethyl acetate, isopropyl acetate, butyl acetate, isobutyl acetate, amyl acetate, isopropyl laurate, isopropyl palmitate, and isopropyl myristate), ethers (such as diethyl ether, diisopropyl ether, tert-butyl methyl ether, dihexyl ether, dimethyl cellosolve, and dioxane), halogenated hydrocarbons (such as tetrachloromethane, chloroform, fluoroethene (1,1,1-trifluoroethane), perchloroethylene, ethylene dichloride, dichloromethane, dichloroethane, trichloroethane, tetrachloroethane, chlorobenzene, dichlorobenzene, chlorofluoromethanes (the substitution numbers of chorine atom(s) and fluorine atom(s) are any numbers as long as each being no less than 1, and being no more than 4 in total), chlorofluoroethanes (the substitution numbers of chorine atom(s) and fluorine atom(s) are any numbers as long as each being no less than 1, and being no more than 6 in total; and the chorine atom(s) and the fluorine atom(s) may be in random positions)), aliphatic alcohols (such as butanol, 2-ethylhexanol, and lauryl alcohol), and mineral oils. For example, when the polymerization reaction of the component (A) is radical polymerization (that may be living polymerization), a C4-10 fatty ester solvent, and a C4-10 aliphatic ketone solvent may be especially preferably used as the polymerization solvent among the above solvents.

(Polymerization Conditions)

The concentration of the component (A) (concentration of all the monomers in total when at least two monomers are used) in the reaction mixture when the polymerization initiates, on the basis of the total mass of the reaction mixture (100 mass %), is preferably no less than 1 mass %, and more preferably no less than 3 mass % in view of enhancing the polymerization rate to enhance the conversion ratio of the monomer to the polymer, and in view of further improving the easy fine dispersibility of the defoaming agent to be obtained; is preferably no more than 30 mass %, more preferably no more than 20 mass %, and further preferably no more than 15 mass % in view of further improving the defoaming performance of the obtained defaming agent; and in one embodiment, can be 1 to 30 mass %, or 3 to 20 mass %, or 3 to 15 mass %.

The concentration of the component (B) in the reaction mixture when the polymerization initiates, on the basis of the total mass of the reaction mixture (100 mass %), is preferably no less than 10 mass %, and more preferably no less than 15 mass % in view of further improving the defoaming performance of the obtained defaming agent; is preferably no more than 40 mass % in view of further improving the easy fine dispersibility of the obtained defoaming agent; and in one embodiment, can be 10 to 40 mass %, or 15 to 40 mass %.

In one embodiment, the amount of the polymerized component (A) is, on the basis of 100 parts by mass of the component (B), preferably no less than 10 parts by mass, and more preferably no less than 15 parts by mass in view of further improving the easy fine dispersibility of the obtained defoaming agent; is preferably no more than 70 parts by mass, and more preferably no more than 50 parts by mass in view of further improving the defoaming performance of the obtained defaming agent; and in one embodiment, can be 10 to 60 parts by mass, or 15 to 50 parts by mass.

In the radical polymerization (such as radical polymerization of a monomer comprising a polymerizable functional group having an ethylenically unsaturated bond), any radical polymerization initiator soluble in the reaction solution at the polymerization temperature may be used without any limitation. As the radical polymerization initiator, for example, a known initiator such as an organic peroxide initiator and an azo compound may be used. The amount of the radical initiator is, on the basis of 100 parts by mass of the component (A), preferably no less than 0.1 parts by mass, and more preferably no less than 1 part by mass in view of enhancing the conversion ratio of the monomer to the polymer; is preferably no more than 10 parts by mass in view of preventing defoaming performance from impairing due to the residue of the radical initiator; and in one embodiment, can be 0.1 to 10 parts by mass, or 1 to 10 parts by mass. In addition to the radical polymerization initiator, a chain transfer agent can be further used. As a chain transfer agent, any chain transfer agent soluble in the reaction solution at the polymerization temperature, such as C1-36 alkyl mercaptans, and C1-36 alkyl disulfides, may be used without particular limitations. The amount of the chain transfer agent is, on the basis of 100 parts by mass of the component (A), preferably no less than 0.01 parts by mass, and more preferably no less than 0.05 parts by mass in view of suppressing the gelation of the defoaming agent polymer; is preferably no more than 5 parts by mass in view of further improving the dispersion stability of the defoaming agent polymer; and in one embodiment, can be 0.01 to 5 parts by mass, or 0.05 to 5 parts by mass.

As a catalyst in the coordinated polymerization (such as coordinated polymerization of a monomer comprising a polymerizable functional group having an ethylenically unsaturated bond), a known homogeneous transition metal catalyst such as: a metallocene or a half metallocene complex of a transition metal such as titanium, zirconium, hafnium, chromium, cobalt, nickel, iron, tantalum, rare earth elements (including samarium, lanthanum, neodymium, ytterbium and lutetium); a complex of a transition metal such as palladium and nickel which has a diimine [N,N] ligand; a complex of a transition metal such as titanium, zirconium and nickel which has a bidentate ([N⁻, N⁻]) or tridentate ([N⁻, N⁻, O/N]) diamide ligand; a complex of a transition metal such as titanium, zirconium, hafnium, vanadium, chromium and nickel which has a phenoxy-imine [O⁻, N] ligand; a complex of a transition metal such as titanium, zirconium and hafnium which has a pyrrolide-imine [N⁻, N] ligand; a complex of a transition metal such as titanium which has an indolido-imine [N⁻, N] ligand; and a complex of a transition metal such as titanium and zirconium which has an imine-phenoxy [N, O⁻] ligand may be used. The catalyst is selected from these catalysts according to the monomer. These catalysts may be used together with at least one catalytic promoter (e.g., an aluminum compound such as methylaluminoxane, trialkylaluminum (e.g., trimethylaluminum, triethylaluminum, and triisobutylaluminum), and dialkylaluminum halides (e.g., diethylaluminum chloride); boron compounds such as tris(perfluorophenyl)boron, and trityltetrakis(perfluorophenyl)borate; dialkylzinc such as diethylzinc; and magnesium halides such as magnesium chloride). The amount of the catalyst can be appropriately selected by those skilled in the art according to the monomer and catalyst system to be used, but can be, for example, 0.1 to 10 parts by mass on the basis of 100 parts by mass of the component (A) to be polymerized.

In the anion polymerization (for example, anion polymerization of a monomer comprising a polymerizable functional group having a cyclic ether structure, and/or a monomer comprising a polymerizable functional group having an ethylenically unsaturated bond), a known initiator (catalyst) such as an organoalkaline metal compounds (e.g., alkyllithium compounds such as n-butyllithium, sec-butyllithium, and tert-butyllithium), Grignard reagent, and metal alkoxide may be used. The amount of the initiator (catalyst) can be, for example, 0.1 to 10 parts by mass on the basis of 100 parts by mass of the component (A).

In the cationic polymerization (for example, cationic polymerization of a monomer comprising a polymerizable functional group having a cyclic ether structure, and/or a monomer comprising a polymerizable functional group having an ethylenically unsaturated bond), a known catalyst (initiator) such as Lewis acids including metal halides (e.g. halides of aluminum, tin, iron, titanium, gallium, indium, zinc, zirconium, hafnium, bismuth, silicon, germanium, antimony, molybdenum and niobium), phosphorus pentafluoride, boron trihalide, tris(perfluorophenyl)boron, dialkylaluminium halides, and alkyl aluminum dihalides; and trialkylaluminum may be used. These catalysts may be used together with any additive (catalytic promoter, initiating species, added salt, or added base) such as water, alcohols, acid chlorides, alkyl halides, tetraalkylammonium salts, tetraalkylphosphonium salts, and bases (e.g., esters, ethers, amines, sulfides, and N,N-dimethylacetamides). The amount of the catalyst (initiator) can be, for example, 0.1 to 10 parts by mass on the basis of 100 parts by mass of the component (A).

The reaction temperature in the polymerization can be, as appropriate, selected by a person skilled in the art according to the composition of the monomer in the component (A), the polymerization reaction, the initiator, the presence or not of the catalyst, the type of the catalyst, and the concentrations of the component (A) and the component (B).

In the defoaming agent according to the present invention, the polymerization of the monomer (A) in the solution where the polysiloxane (B) is dissolved causes the easy fine dispersibility of the defoaming agent to be improved. Thus, this defoaming agent is also easily finely dispersed in a lubricating oil composition even when the defoaming agent is incorporated into the lubricating oil composition in the same manner as conventional. Further, the defoaming agent is kept finely dispersed in the lubricating oil composition even after a long time, or even after strong centrifugal effect occurs thereto. Therefore, the incorporation of this defoaming agent into the lubricating oil composition can prevent defoaming performance from impairing, which is induced by the segregation and the precipitation of the defoaming agent.

The easy fine dispersibility of the defoaming agent which is obtained by the polymerization may be evaluated from the average particle size of defoaming agent particles in a dispersion comprising the defoaming agent. The average particle size (average particle size obtained by dynamic light scattering and cumulant analysis) of the defoaming agent particles in a dispersion (at 25° C.) which is obtained by adding 1 mL of a solution comprising the defoaming agent after the polymerization to 10 mL of a mineral oil, and sufficiently stirring the resultant, and in which the defoaming agent is finely dispersed is preferably no more than 10 μm, more preferably no more than 5 μm, and further preferably no more than 2 μm in view of further suppressing the segregation and the precipitation of the defoaming agent and in view of improving defoaming performance; and in one embodiment, can be 0.05 to 10 μm, or 0.1 to 5 μm, or 0.1 to 2 μm. For measuring the average particle size, for example, YUBASE™ 4 produced by SK Lubricants Co., Ltd. (kinematic viscosity (100° C.): 4.2 mm²/s, kinematic viscosity (40° C.): 19.4 mm²/s, viscosity index: 125) may be preferably used as the mineral oil. The above stirring may be preferably carried out in a 100 mL beaker with a columnar magnetic stir bar made from PTFE of 8 mm in diameter and 30 mm in length at ambient temperature at 200 rpm for 30 minutes. For measuring the average particle size by dynamic light scattering, for example, a dynamic light scattering measurement device, Photal ELSZ-2000S (manufactured by Otsuka Electronics Co., Ltd.) may be preferably used. The defoaming agent according to the present invention makes it easy to obtain a dispersion comprising defoaming agent particles having an average particle size of no more than 10 μm, and no special operation other than stirring is necessary for obtaining such a dispersion.

<2. Lubricating Oil Composition>

The second aspect of the present invention is a lubricating oil composition comprising: a lubricant base oil; and the defoaming agent according to the first aspect of the present invention. As the defoaming agent according to the first aspect of present invention, one defoaming agent may be used alone, and two or more defoaming agents may be used in combination.

(Lubricant Base Oil)

The lubricant base oil in the lubricating oil composition according to the present invention is not specifically restricted; and a mineral base oil or a synthetic base oil used for conventional lubricating oils may be used.

Examples of the mineral base oil include oils each obtained by refining a lubricant oil fraction that is obtained by vacuum distillation of an atmospheric residue obtained by atmospheric distillation of crude oil, through at least one of processes such as solvent deasphalting, solvent extraction, hydrocracking, solvent dewaxing, and hydrorefining; wax isomerized mineral oils; and lubricant base oils produced by a process of isomerizing GTL WAX (gas to liquid wax) that is produced by, for example, a Fischer-Tropsch process.

Examples of the synthetic base oil include poly-$\alpha$-olefins such as 1-octene oligomer and 1-decene oligomer, or hydrogenated products thereof; isobutene oligomer or hydrogenated products thereof; paraffin; diesters (such as ditridecyl glutarate, bis(2-ethylhexyl)adipate, diisodecyl adipate, ditridecyl adipate, and bis(2-ethylhexyl)sebacate); polyol esters (such as trimethylolpropane caprylate, trimethylolpropane pelargonate, pentaerythritol 2-ethylhexanoate, and pentaerythritol pelargonate); polyoxyalkylene glycol; dialkyl diphenyl ether; and polyphenyl ether. Other examples of the synthetic base oil include aromatic synthetic oils such as alkylnaphthalene, alkylbenzene, and aromatic esters, or mixtures thereof.

In the lubricating oil composition according to the present invention, the mineral base oil, the synthetic base oil, a mixture of two or more lubricating oils selected therefrom, or the like may be used as the lubricant base oil. Examples of the lubricant base oil include at least one mineral base oil, at least one synthetic base oil, and a mixed oil of at least one mineral base oil and at least one synthetic base oil.

The kinematic viscosity of the base oil (total base oil) at 40° C. is preferably 1.0 to 100 mm$^2$/s. Too high kinematic viscosity of the base oil tends to make low-temperature viscosity deteriorated; and too low kinematic viscosity of the base oil impairs anti-wear performance on various sliding parts of machinery. In view of preventing the viscosity of the obtained lubricating oil composition from decreasing, the kinematic viscosity of the base oil (total base oil) at 40° C. is preferably 1.0 to 50 mm$^2$/s, and especially preferably 1.0 to 25 mm$^2$/s.

The pour point of the base oil (total base oil) is not specifically restricted, but is preferably no more than −10° C., and especially preferably no more than −15° C.

When the kinematic viscosity of the base oil (total base oil) at 100° C. is no less than 2 mm$^2$/s, the viscosity index thereof is preferably no less than 105 in view of preventing viscosity from decreasing at high temperature.

The content of the base oil (total base oil) in the lubricating oil composition can be, for example, in an amount of 80 to 99 mass %, or 85 to 99 mass %, on the basis of the total composition.

(Defoaming Agent)

The defoaming agent according to the first aspect of the present invention has already been described in detail. The content of the defoaming agent according to the first aspect of the present invention (in total when this defoaming agent is two or more defoaming agents in combination) in the lubricating oil composition in terms of silicon on the basis of the total mass of the composition is preferably in an amount of no less than 1 mass ppm, and more preferably in an amount of no less than 5 mass ppm in view of further improving defoaming performance; is preferably in an amount of no more than 100 mass ppm, and more preferably in an amount of no more than 50 mass ppm in view of further suppressing the precipitation of the defoaming agent to further improve the lifetime of the defoaming agent; and in one embodiment, can be 1 to 100 mass ppm, or 5 to 50 mass ppm. In the present description, the silicon content in an oil shall be measured by inductively coupled plasma atomic emission spectroscopy (intensity ratio method (internal standard method)), conforming to JIS K0116.

(Other Additives)

The lubricating oil composition according to the present invention can further contain at least one additive selected from an ashless dispersant, an antioxidant, a friction modifier, an anti-wear agent or an extreme-pressure agent, a metallic detergent, a viscosity index improver or a pour point depressant, a corrosion inhibitor, an anti-rust agent, a metal deactivator, a demulsifier, a defoaming agent other than the defoaming agent according to the first aspect of the present invention, and a coloring agent, in addition to the above-described lubricant base oil and the defoaming agent according to the first aspect of the present invention. One may have an additive package by adding one or more additive(s) selected from them to the defoaming agent according to the first aspect of the present invention.

Any known ashless dispersant such as succinimide ashless dispersants may be used as an ashless dispersant; and examples thereof include polybutenylsuccinimides having polybutenyl groups having number average molecular weights of 900 to 3500; polybutenylbenzylamines; polybutenylamines; and derivatives thereof (such as boric acid-modified products).

When the lubricating oil composition according to the present invention comprises the ashless dispersant, the content of the ashless dispersant therein is normally in an amount of no less than 0.01 mass %, preferably in an amount of no less than 0.1 mass %, normally in an amount of no more than 20 mass %, and preferably in an amount of no more than 10 mass %, on the basis of the total mass of the lubricating oil composition, that is, on the basis of 100 mass % of the total lubricating oil composition.

Any known antioxidant such as phenolic antioxidants and amine antioxidants may be used as an antioxidant; and examples hereof include amine antioxidants such as alkylated diphenylamines, phenyl-$\alpha$-naphthylamine, and alkylated $\alpha$-naphthylamines; and phenolic antioxidants such as 2,6-di-tert-butyl-4-methylphenol, 4,4'-methylenebis(2,6-di-tert-butylphenol).

When the lubricating oil composition according to the present invention comprises the antioxidant, the content of the antioxidant therein is normally in an amount of no more than 5.0 mass %, preferably in an amount of no more than 3.0 mass %, preferably in an amount of no less than 0.1 mass %, and more preferably in an amount of no less than 0.5 mass % on the basis of the total mass of the lubricating oil composition.

Any known friction modifier can be used as a friction modifier; and examples thereof include aliphatic acid esters; aliphatic acid amides; phosphorus compounds such as phosphate esters, phosphite esters, and thiophosphate esters; organic molybdenum compounds such as MoDTP and MoDTC; organic zinc compounds such as ZnDTP; organic boron compounds such as alkylmercaptyl borates; graphite; molybdenum disulfide; antimony sulfide; boron compounds; and polytetrafluoroethylene.

When the lubricating oil composition according to the present invention comprises the friction modifier, the content of the friction modifier therein is normally in an amount of 0.05 to 5 mass % on the basis of the total mass of the lubricating oil composition.

Any known anti-wear agent or extreme-pressure agent may be used as an anti-wear agent or an extreme-pressure agent; and examples thereof include metal dithiophosphates (such as Zn salt, Pb salt, Sb salt, and Mo salt), metal dithiocarbamates (such as Zn salt, Pb salt, Sb salt, and Mo salt), naphthenic acid metal salts (such as Pb salt), fatty acid metal salts (such as Pb salt), boron compounds, phosphate esters, phosphite esters, alkyl hydrogenphosphites, phosphate ester amine salts, phosphate ester metal salts (such as Zn salt), disulfides, sulfurized fat, sulfurized olefins, dialkyl polysulfides, diarylalkyl polysulfides, and diaryl polysulfides.

When the lubricating oil composition according to the present invention comprises the anti-wear agent or extreme-pressure agent, the content of the anti-wear agent or extreme-pressure agent therein is normally in an amount of 0.05 to 5 mass % on the basis of the total mass of the lubricating oil composition.

Any known metallic detergent may be used as a metallic detergent; and examples thereof include alkali metal and alkaline earth metal sulfonates, alkali metal and alkaline earth metal phenates, alkali metal and alkaline earth metal salicylates, and combinations thereof. These metallic detergents may be overbased. In the present description, "alkaline earth metal" shall encompass Mg.

When the lubricating oil composition according to the present invention comprises the metallic detergent, the content thereof is not specifically restricted. When the composition is for automobile transmissions, the content thereof is normally in an amount of 0.005 to 1.0 mass % in terms of metal elements on the basis of the total mass of the lubricating oil composition. When the composition is for internal combustion engines, the content of the metallic detergent is normally in an amount of 0.01 to 5.0 mass % in terms of metal elements on the basis of the total mass of the lubricating oil composition. When the composition is for automobile transaxle units, the content of the metallic detergent is normally in an amount of 0.001 to 0.1 mass % in terms of metal elements on the basis of the total mass of the lubricating oil composition.

Any known viscosity index improver or pour point depressant may be used as a viscosity index improver or a pour point depressant. Examples of the viscosity index improver include so-called non-dispersant viscosity index improvers such as polymers and copolymers of one or at least two monomers selected from various methacrylates, and hydrogen adducts thereof; so-called dispersant viscosity index improvers that are copolymers of various methacrylates containing nitrogen compounds; non-dispersant or dispersant ethylene-α-olefin copolymers and hydrogen adducts thereof; polyisobutylene and hydrogen adducts thereof; hydrogen adducts of styrene-diene copolymers; styrene-maleic anhydride copolymers; and polyalkylstyrenes. When the lubricating oil composition according to the present invention comprises the viscosity index improver or pour point depressant, the content of the viscosity index improver or pour point depressant therein is normally in an amount of 0.1 to 20 mass % on the basis of the total mass of the lubricating oil composition.

Examples of the pour point depressant include polymethacrylate polymers. When the lubricating oil composition according to the present invention comprises the pour point depressant, the content of the pour point depressant therein is normally in an amount of 0.01 to 2 mass % on the basis of the total mass of the lubricating oil composition.

The defoaming agent according to the first aspect of the present invention is obtained by polymerizing the monomer in the solvent where the non-polymerizable polysiloxane is dissolved. The inventors of the present invention have confirmed that the polysiloxane cannot be segregated from the defoaming agent after the polymerization; and that the polymer not containing the polysiloxane cannot be segregated from the defoaming agent after the polymerization.

Any known corrosion inhibitor such as benzotriazole compounds, tolyltriazole compounds, thiadiazole compounds, and imidazole compounds may be used as a corrosion inhibitor. When the lubricating oil composition according to the present invention comprises the corrosion inhibitor, the content of the corrosion inhibitor therein is normally in an amount of 0.005 to 5 mass % on the basis of the total mass of the lubricating oil composition.

Any known anti-rust agent such as petroleum sulfonates, alkylbenzenesulfonates, dinonylnaphthalenesulfonates, alkylsulfonate salts, fatty acids, alkenylsuccinic acid half esters, fatty acid soaps, polyol esters of fatty acids, aliphatic amines, oxidized paraffins, and alkyl polyoxyethylene ethers may be used as an anti-rust agent. When the lubricating oil composition according to the present invention comprises the anti-rust agent, the content of the anti-rust agent therein is normally in an amount of 0.005 to 5 mass % on the basis of the total mass of the lubricating oil composition.

Any known metal deactivator such as imidazoline, pyrimidine derivatives, alkylthiadiazoles, mercaptobenzothiazole, benzotriazole and derivatives thereof, 1,3,4-thiadiazole polysulfides, 1,3,4-thiadiazolyl-2,5-bis(dialkyldithiocarbamate), 2-(alkyldithio)benzimidazoles, and β-(o-carboxybenzylthio)propionitrile may be used as a metal deactivator. When the lubricating oil composition according to the present invention comprises any of these metal deactivators, the content of the metal deactivator therein is normally in an amount of 0.005 to 1 mass % on the basis of the total mass of the lubricating oil composition.

Any known demulsifier such as polyalkylene glycol-based nonionic surfactants may be used as a demulsifier. When the lubricating oil composition according to the present invention comprises the demulsifier, the content of the demulsifier therein is normally in an amount of 0.005 to 5 mass % on the basis of the total mass of the lubricating oil composition.

Any known defoaming agent such as silicone, fluorosilicone, and fluoroalkyl ethers may be used as a defoaming agent other than the defoaming agent according to the first aspect. When the lubricating oil composition according to the present invention comprises any of these defoaming agents, the content of the defoaming agent therein is normally in an amount of 0.0001 to 0.1 mass % on the basis of the total mass of the lubricating oil composition.

Any known coloring agent such as azo compounds may be used as a coloring agent.

(Lubricating Oil Composition)

The viscosity of the lubricating oil composition according to the present invention is not restricted. Generally, the defoaming agent according to the first aspect of the present invention may be preferably used in a lubricating oil composition having a kinematic viscosity at 40° C. of 2 mm$^2$/s to 50 mm$^2$/s, and is especially effective in a lubricating oil composition having a kinematic viscosity at 40° C. of 2 mm$^2$/s to 25 mm$^2$/s which is of relatively low viscosity.

The lubricating oil composition according to the present invention, owing to improved storage stability of the defoaming agent, enables the segregation and the precipitation of the defoaming agent to be suppressed even during long-term storage, and thereby, to prevent defoaming performance from impairing. The lubricating oil composition according to the present invention can also keep deforming performance well for a long time even under such a lubricating condition that a high centrifugal effect occurs to the lubricating oil. As a result, the lubricating oil can be defoamed for a long time, which also enables the promotion of the deterioration of the lubricating oil, hydraulic control failure, wear and seizure, etc. which are induced by the foaming, to be suppressed for a long time.

(Use)

The lubricating oil composition according to the present invention may be widely used for the purpose of lubrication that requires defoaming performance especially in view of the above-described functions and effects. For example, the lubricating oil composition according to the present invention may be preferably used as an internal combustion engine oil, a hydraulic oil, an industrial gear oil, a turbine oil, a compressor oil, a transmission oil, and an automobile axle unit oil; and among them, especially preferably used as an automobile engine oil, a transmission oil for automobiles (that may be electric vehicles), or an automobile axle unit oil.

(Production)

A known method may be employed for incorporating the defoaming agent according to the first aspect of the present invention into the lubricating oil composition. For example, the lubricating oil composition comprising the defoaming agent according to the first aspect of the present invention may be produced by adding a solution obtained by the polymerization and comprising the defoaming agent according to the first aspect of the present invention to a diluting solvent and stirring the resultant mixture, and thereby, preparing a dilution comprising the defoaming agent finely dispersed therein, and thereafter, adding the dilution to a lubricating oil comprising the base oil, or comprising the base oil and at least one additive other than the defoaming agent. For example, the lubricating oil composition comprising the defoaming agent according to the first aspect of the present invention may be also produced by dissolving the solution comprising the defoaming agent according to the first aspect of the present invention in a diluting solvent (such as a hydrocarbon solvent) in which the base oil and the defoaming agent can dissolve, and thereby, preparing a dilution comprising the defoaming agent dissolved therein, and thereafter, adding the dilution to a lubricating oil comprising the base oil, or comprising the base oil and at least one additive other than the defoaming agent, and stirring the resultant mixture, to finely disperse the defoaming agent in the lubricating oil. A solvent which is soluble in the base oil and in which the defoaming agent can dissolve or the defoaming agent can finely disperse may be preferably used as the diluting solvent. The base oil may be used as the diluting solvent.

The concentration of the defoaming agent in the dilution in terms of silicon on the basis of the total mass of the dilution is preferably no less than 500 mass ppm, more preferably no less than 1,000 mass ppm, and further preferably no less than 2,000 mass ppm in view of reducing the influence of the dilution on the flash point of the lubricating oil; is preferably no more than 50,000 mass ppm, and more preferably no more than 40,000 mass ppm in view of further suppressing the precipitation of the defoaming agent to further improve the lifetime of the defoaming agent; and in one embodiment, can be 500 to 50,000 mass ppm, or 1,000 to 50,000 mass ppm, or 2,000 to 40,000 mass ppm.

The amount of the dilution added to the lubricating oil may be any amount that makes the above-described preferred concentration of the defoaming agent in the lubricating oil composition according to the present invention realized.

The lubricating oil before the dilution is added may already contain the additive(s) other than the defoaming agent, in addition to the base oil. One may also add the diluent, and thereafter, add the other additive(s), to the lubricating oil comprising the base oil and no additive other than the defoaming agent.

For adding the dilution to the lubricating oil, one may mix the lubricating oil while successively adding (for example, dripping) the dilution to the lubricating oil little by little; or one may add a desired amount of the dilution to the lubricating oil in one portion. In view of facilitating finer dispersion of the defoaming agent in the lubricating oil, or in view of improving the uniformity of the concentration of the defoaming agent in the lubricating oil composition, it is preferable to mix the lubricating oil while successively add the dilution.

EXAMPLES

Hereinafter the present invention will be further specifically described based on examples and comparative examples. The following examples are intended to illustrate, but not to limit the present invention.

Preparation Examples 1 to 14

(Measurement of Average Particle Size of Defoaming Agent)

In each of the following preparation examples, the average particle size of a defoaming agent obtained by polymerization was calculated by cumulant analysis based on the result of dynamic light scattering measurement subjected to a sample (25° C.) prepared by adding 1 mL of a solution comprising the defoaming agent after the polymerization to 10 mL of a mineral oil, sufficiently stirring the resultant, and thereby, finely dispersing the defoaming agent. The dynamic light scattering measurement was carried out using a dynamic light scattering measurement device, Photal ELSZ-0 (manufactured by Otsuka Electronics Co., Ltd.). YUBASE™ 4 manufactured by SK Lubricants Co., Ltd. (kinematic viscosity (100° C.): 4.2 mm$^2$/s, kinematic viscosity (40° C.): 19.4 mm$^2$/s, viscosity index: 125) was used as the mineral oil. For the stirring, the mixture was stirred in a 100 mL beaker with a columnar magnetic stir bar made from PTFE (polytetrafluoroethylene) of 8 mm in diameter and 30 mm in length at ambient temperature at 200 rpm for 30 minutes.

Preparation Example 1

A defoaming agent A was prepared by solution polymerization, according to the following procedures.

To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of diisobutyl ketone as a polymerization solvent, 1.8 parts by mass of stearyl methacrylate and 0.2 parts by mass of EGDMA (ethylene glycol dimethacrylate) as a monomer, 10 parts by mass of polydimethylsilicone (KF-96-60000 produced by Shin-Etsu Chemical Co., Ltd.: in the general formula (2), $R^1$, $R^2$ and $R^5$ to $R^{10}$ were each a methyl group, m=0, the average fluorination ratio of a polysiloxane structure was 0, and the weight average molecular weight was 95,000) as a polysiloxane, and 0.036 parts by mass of dodecyl mercaptan as a modifier were introduced and stirred to be a uniform solution, and thereafter, the reaction system was vacuum-degassed and purged with nitrogen five times using a diaphragm pump. Under a nitrogen flow, 0.036 parts by mass of PEROCTA O (1,1,3,3-tetramethylbutyl peroxy- 2-ethylhexanoate; peroxide radical polymerization initiator; manufactured by NOF CORPORATION) as a radical polymerization initiator was introduced from the sample inlet, and the resultant mixture was stirred for 8 hours at a polymerization temperature of 70° C. in a nitrogen atmosphere to cause a polymerization reaction, to afford a solution of a defoaming agent. The average particle size of defoaming agent particles in a dispersion according to the above procedures was measured, and was 0.20 μm.

Preparation Examples 2 and 3

Defoaming agents B and C were prepared in the same manner as in preparation example 1 by solution polymerization except that the (A) monomer, the (B) polysiloxane, the (C) polymerization solvent, the radical initiator, and the modifier, and the amounts thereof were changed as the following table 1.

Preparation Example 4

A defoaming agent D was prepared by solution polymerization according to the following procedures.

To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of diisobutyl ketone as a polymerization solvent, 1.8 parts by mass of stearyl methacrylate and 0.2 parts by mass of EGDMA as a monomer, 10 parts by mass of fluorosilicone (a concentrate obtained by removing a diluting solvent ex vacuo from FA-600 produced by Shin-Etsu Chemical Co., Ltd.: in the general formula (2), $R^1$, $R^2$, $R^4$ and $R^5$ to $R^{10}$ were each a methyl group, $R^3$ was a 3,3,3-trifluoropropyl group, the average fluorination ratio of a polysiloxane structure was 0.5, and the weight average molecular weight was 30,000) as a polysiloxane, and 0.036 parts by mass of dodecyl mercaptan as a modifier were introduced and stirred to be a uniform solution, and thereafter, the reaction system was vacuum-degassed and purged with nitrogen five times using a diaphragm pump. Under a nitrogen flow, 0.036 parts by mass of PEROCTA O (1,1,3,3-tetramethylbutyl peroxy-2-ethylhexanoate; peroxide radical polymerization initiator; manufactured by NOF CORPORATION) as a radical polymerization initiator was introduced from the sample inlet, and the resultant mixture was stirred for 8 hours at a polymerization temperature of 70° C. in a nitrogen atmosphere to cause a polymerization reaction, to afford a solution of a defoaming agent. The average particle size of defoaming agent particles in a dispersion according to the above procedures was measured, and was 0.20 μm.

Preparation Examples 5 to 14

Defoaming agents E to N were prepared in the same manner as preparation example 4 by solution polymerization except that the (A) monomer, the (B) polysiloxane, the (C) polymerization solvent, the radical initiator, and the modifier, and the amounts thereof were changed as the following tables 1 to 2.

Preparation Example 15

A polymethacrylate was produced by solution polymerization in the same manner as in preparation example 4 except that the (B) polysiloxane was not incorporated in the polymerization system, and thereafter, 10 parts by mass of fluorosilicone (a concentrate obtained by removing a diluting solvent ex vacuo from FA-600 produced by Shin-Etsu Chemical Co., Ltd.: in the general formula (2), $R^1$, $R^2$, $R^4$ and $R^5$ to $R^{10}$ were each a methyl group, $R^3$ was a 3,3,3-trifluoropropyl group, the average fluorination ratio of a polysiloxane structure was 0.5, and the weight average molecular weight was 30,000) was added to and mixed with the reaction solution, and thereby, a defoaming agent R was prepared.

TABLE 1

| | | Preparation examples | | | | | | |
|---|---|---|---|---|---|---|---|---|
| | | 1 | 2 | 3 | 4 | 5 | 6 | 7 |
| | | Defoaming agent | | | | | | |
| | | A | B | C | D | E | F | G |
| (A) Monomer | stearyl methacrylate | 1.8 | 2.7 | 3.6 | 1.8 | 2.7 | 3.6 | 3.6 |
| | dodecyl methacrylate | | | | | | | |
| | 2-ethylhexyl methacrylate | | | | | | | |
| | EGDMA | 0.2 | 0.3 | 0.4 | 0.2 | 0.3 | 0.4 | |
| (B) Polysiloxane | polydimethylsilicone | 10 | 10 | 10 | | | | |
| | fluorosilicone | | | | 10 | 10 | 10 | 10 |
| (C) Solvent | diisobutyl ketone | 30 | 30 | 30 | 30 | 30 | 30 | 30 |
| | ethyl acetate | | | | | | | |
| | n-butyl acetate | | | | | | | |
| | methyl isobutyl ketone | | | | | | | |
| | cyclohexanone | | | | | | | |
| Others | polymerization initiator | 0.036 | 0.055 | 0.072 | 0.036 | 0.055 | 0.072 | 0.072 |
| | dodecyl mercaptan | 0.036 | 0.055 | 0.072 | 0.036 | 0.055 | 0.072 | |
| | Average particle size (μm) | 0.20 | 0.19 | 0.21 | 0.20 | 0.29 | 0.22 | 0.23 |

TABLE 2

| | | Preparation examples | | | | | | |
|---|---|---|---|---|---|---|---|---|
| | | 8 | 9 | 10 | 11 | 12 | 13 | 14 |
| | | Defoaming agent | | | | | | |
| | | H | I | J | K | L | M | N |
| (A) Monomer | stearyl methacrylate | 1.8 | 1.8 | 1.8 | 1.8 | | | 0.9 |
| | dodecyl methacrylate | | | | | 1.8 | | 0.9 |
| | 2-ethylhexyl methacrylate | | | | | | 1.8 | |
| | EGDMA | 0.2 | 0.2 | 0.2 | 0.2 | 0.2 | 0.2 | 0.2 |
| (B) Polysiloxane | polydimethylsilicone | | | | | | | |
| | fluorosilicone | 10 | 10 | 10 | 10 | 10 | 10 | 10 |
| (C) Solvent | diisobutyl ketone | | | | | 30 | 30 | 30 |
| | ethyl acetate | 30 | | | | | | |
| | n-butyl acetate | | 30 | | | | | |
| | methyl isobutyl ketone | | | 30 | | | | |
| | cyclohexanone | | | | 30 | | | |
| Others | polymerization initiator | 0.036 | 0.036 | 0.036 | 0.036 | 0.036 | 0.036 | 0.036 |
| | dodecyl mercaptan | 0.036 | 0.036 | 0.036 | 0.036 | 0.036 | 0.036 | 0.036 |
| Average particle size (μm) | | 0.20 | 0.19 | 0.23 | 0.23 | 0.22 | 0.37 | 0.22 |

Examples 1 to 21 and Comparative Examples 1 to 3

As shown in tables 3 to 4, lubricating oil compositions according to the present invention (examples 1 to 21), and lubricating oil compositions for comparison (comparative examples 1 to 3) were prepared. In tables 3 to 4, "mass %" in the boxes of the "base oil composition" means mass % on the basis of the total mass of the base oils; "mass %" in the other boxes means mass % on the basis of the total mass of the lubricating oil composition; and "Si ppm" means mass ppm in terms of silicon on the basis of the total mass of the composition. For incorporating the defoaming agent into the lubricating oil composition, the defoaming agent, or a solution or dispersion comprising the defoaming agent was added to kerosene, and the resultant was sufficiently stirred, and thereby, a dilution comprising the defoaming agent dissolved in the kerosene (defoaming agent content: in an amount of 0.3 mass % in terms of silicon on the basis of the total mass of the dilution) was prepared, and thereafter, the lubricating oil composition was stirred and mixed while the dilution was dripped thereto, to afford the lubricating oil composition having the defoaming agent content as in every table 3 to 4. In tables 3 to 4, the components other than the defoaming agents A to N and R produced in preparation examples 1 to 15 in detail were as follows.

(Base Oils)
O-1: hydrorefined mineral oil, kinematic viscosity (100° C.): 2.2 mm²/s, kinematic viscosity (40° C.): 7.5 mm²/s, viscosity index: 106
O-2: hydrorefined mineral oil, kinematic viscosity (100° C.): 4.2 mm²/s, kinematic viscosity (40° C.): 19.6 mm²/s, viscosity index: 123
O-3: ester base oil, kinematic viscosity (100° C.): 2.7 mm²/s, kinematic viscosity (40° C.): 8.6 mm²/s, viscosity index: 178

(Defoaming Agents)
defoaming agent P: dimethyl silicone defoaming agent (KF-96-50000CS produced by Shin-Etsu Chemical Co., Ltd., weight average molecular weight: 95,000)
defoaming agent Q: fluorosilicone defoaming agent (FA-600 produced by Shin-Etsu Chemical Co., Ltd., weight average molecular weight: 30,000)

(Other Additives)
V-1: polymethacrylate viscosity index improver, weight average molecular weight: 20,000
W-1: additive package (comprising a boric acid-modified succinimide, a phosphorus-containing anti-wear agent, a Ca sulfonate detergent, an ashless friction modifier, an antioxidant, and a metal deactivator)

TABLE 3

| | | Examples | | | | | | |
|---|---|---|---|---|---|---|---|---|
| | | 1 | 2 | 3 | 4 | 5 | 6 | 7 |
| Base oil composition | | | | | | | | |
| O-1 | mass % | 80 | 80 | 80 | 80 | 80 | 80 | 80 |
| O-2 | mass % | 20 | 20 | 20 | 20 | 20 | 20 | 20 |
| O-3 | mass % | | | | | | | |
| Total base oil | mass % | balance | balance | balance | balance | balance | balance | balance |
| Defoaming agent | | | | | | | | |
| defoaming agent A | Si ppm | 10 | | | | | | 5 |
| defoaming agent B | Si ppm | | 10 | | | | | |
| defoaming agent C | Si ppm | | | 10 | | | | |
| defoaming agent D | Si ppm | | | | 10 | | | |
| defoaming agent E | Si ppm | | | | | 10 | | |
| defoaming agent F | Si ppm | | | | | | 10 | |
| defoaming agent P* | Si ppm | | | | | | | 5 |
| defoaming agent Q* | Si ppm | | | | | | | |

TABLE 3-continued

| Other additives | | | | | | | |
|---|---|---|---|---|---|---|---|
| V-1 | mass % | | | | | | |
| W-1 | mass % | 10 | 10 | 10 | 10 | 10 | 10 | 10 |
| Kinematic viscosity of composition | | | | | | | | |
| 40° C. | mm²/s | 12.4 | 12.4 | 12.4 | 12.4 | 12.4 | 12.4 | 12.4 |
| 100° C. | mm²/s | 3.4 | 3.4 | 3.4 | 3.4 | 3.4 | 3.4 | 3.4 |
| Fresh oil | | | | | | | | |
| foam volume in homogenizer test | mL | 20 | 20 | 20 | 20 | 20 | 20 | 20 |
| silicon content in oil | ppm | 10 | 10 | 10 | 10 | 10 | 10 | 10 |
| Supernatant after 3-hour centrifugation | | | | | | | | |
| foam volume in homogenizer test | mL | 20 | 20 | 20 | 20 | 20 | 20 | 20 |
| silicon content in oil | ppm | 7 | 7 | 8 | 6 | 7 | 7 | 6 |

| | | Examples | | | | | |
|---|---|---|---|---|---|---|---|
| | | 8 | 9 | 10 | 11 | 12 | 13 |
| Base oil composition | | | | | | | |
| O-1 | mass % | 80 | 80 | 80 | 80 | 72 | 80 |
| O-2 | mass % | 20 | 20 | 20 | 20 | 18 | 20 |
| O-3 | mass % | | | | | 10 | |
| Total base oil | mass % | balance | balance | balance | balance | balance | balance |
| Defoaming agent | | | | | | | |
| defoaming agent A | Si ppm | 5 | | | 10 | 10 | 10 |
| defoaming agent B | Si ppm | | | | | | |
| defoaming agent C | Si ppm | | | | | | |
| defoaming agent D | Si ppm | | 5 | 5 | | | |
| defoaming agent E | Si ppm | | | | | | |
| defoaming agent F | Si ppm | | | | | | |
| defoaming agent P* | Si ppm | | 5 | | | | |
| defoaming agent Q* | Si ppm | 5 | | 5 | | | |
| Other additives | | | | | | | |
| V-1 | mass % | | | | | 7 | |
| W-1 | mass % | 10 | 10 | 10 | 10 | 10 | |
| Kinematic viscosity of composition | | | | | | | |
| 40° C. | mm²/s | 12.4 | 12.4 | 12.4 | 19.1 | 12.4 | 8.9 |
| 100° C. | mm²/s | 3.4 | 3.4 | 3.4 | 4.5 | 3.5 | 2.5 |
| Fresh oil | | | | | | | |
| foam volume in homogenizer test | mL | 20 | 20 | 20 | 20 | 20 | 20 |
| silicon content in oil | ppm | 10 | 10 | 10 | 10 | 10 | 10 |
| Supernatant after 3-hour centrifugation | | | | | | | |
| foam volume in homogenizer test | mL | 20 | 20 | 20 | 30 | 20 | 20 |
| silicon content in oil | ppm | 4 | 5 | 4 | 7 | 7 | 7 |

TABLE 4

| | | Examples | | | | | |
|---|---|---|---|---|---|---|---|
| | | 14 | 15 | 16 | 17 | 18 | 19 |
| Base oil composition | | | | | | | |
| O-1 | mass % | 80 | 80 | 80 | 80 | 80 | 80 |
| O-2 | mass % | 20 | 20 | 20 | 20 | 20 | 20 |
| O-3 | mass % | | | | | | |
| Total base oil | mass % | balance | balance | balance | balance | balance | balance |
| Defoaming agent | | | | | | | |
| defoaming agent G | Si ppm | 10 | | | | | |
| defoaming agent H | Si ppm | | 10 | | | | |

TABLE 4-continued

|  |  |  |  |  |  |  |
|---|---|---|---|---|---|---|
| defoaming agent I | Si ppm |  | 10 |  |  |  |
| defoaming agent J | Si ppm |  |  | 10 |  |  |
| defoaming agent K | Si ppm |  |  |  | 10 |  |
| defoaming agent L | Si ppm |  |  |  |  | 10 |
| defoaming agent M | Si ppm |  |  |  |  |  |
| defoaming agent N | Si ppm |  |  |  |  |  |
| defoaming agent P* | Si ppm |  |  |  |  |  |
| defoaming agent Q* | Si ppm |  |  |  |  |  |
| defoaming agent R* | Si ppm |  |  |  |  |  |
| Other additives |  |  |  |  |  |  |
| V-1 | mass % |  |  |  |  |  |
| W-1 | mass % | 10 | 10 | 10 | 10 | 10 | 10 |
| Kinematic viscosity of composition |  |  |  |  |  |  |
| 40° C. | mm²/s | 12.4 | 12.4 | 12.4 | 12.4 | 12.4 | 12.4 |
| 100° C. | mm²/s | 3.4 | 3.4 | 3.4 | 3.4 | 3.4 | 3.4 |
| Fresh oil |  |  |  |  |  |  |
| foam volume in homogenizer test | mL | 20 | 20 | 20 | 20 | 20 | 20 |
| silicon content in oil | ppm | 10 | 10 | 10 | 10 | 10 | 10 |
| Supernatant after 3-hour centrifugation |  |  |  |  |  |  |
| foam volume in homogenizer test | mL | 20 | 20 | 20 | 20 | 20 | 20 |
| silicon content in oil | ppm | 7 | 7 | 6 | 7 | 7 | 7 |

|  |  | Examples | | Comparative examples | | |
|---|---|---|---|---|---|---|
|  |  | 20 | 21 | 1 | 2 | 3 |
| Base oil composition |  |  |  |  |  |  |
| O-1 | mass % | 80 | 80 | 80 | 80 | 80 |
| O-2 | mass % | 20 | 20 | 20 | 20 | 20 |
| O-3 | mass % |  |  |  |  |  |
| Total base oil | mass % | balance | balance | balance | balance | balance |
| Defoaming agent |  |  |  |  |  |  |
| defoaming agent G | Si ppm |  |  |  |  |  |
| defoaming agent H | Si ppm |  |  |  |  |  |
| defoaming agent I | Si ppm |  |  |  |  |  |
| defoaming agent J | Si ppm |  |  |  |  |  |
| defoaming agent K | Si ppm |  |  |  |  |  |
| defoaming agent L | Si ppm |  |  |  |  |  |
| defoaming agent M | Si ppm | 10 |  |  |  |  |
| defoaming agent N | Si ppm |  | 10 |  |  |  |
| defoaming agent P* | Si ppm |  |  | 10 |  |  |
| defoaming agent Q* | Si ppm |  |  |  | 10 |  |
| defoaming agent R* | Si ppm |  |  |  |  | 10 |
| Other additives |  |  |  |  |  |  |
| V-1 | mass % |  |  |  |  |  |
| W-1 | mass % | 10 | 10 | 10 | 10 | 10 |
| Kinematic viscosity of composition |  |  |  |  |  |  |
| 40° C. | mm²/s | 12.4 | 12.4 | 12.4 | 12.4 | 12.4 |
| 100° C. | mm²/s | 3.4 | 3.4 | 3.4 | 3.4 | 3.4 |
| Fresh oil |  |  |  |  |  |  |
| foam volume in homogenizer test | mL | 20 | 20 | 30 | 20 | 20 |
| silicon content in oil | ppm | 10 | 10 | 10 | 10 | 10 |
| Supernatant after 3-hour centrifugation |  |  |  |  |  |  |
| foam volume in homogenizer test | mL | 20 | 20 | 100 | 100 | 100 |
| silicon content in oil | ppm | 5 | 7 | 0 | 0 | 0 |

(Evaluation of Defoaming Performance of Fresh Oil (1): Homogenizer Test)

The defoaming performance of each of the lubricating oil compositions of examples 1 to 21 and comparative examples 1 to 3 was evaluated with a homogenizer test machine shown in FIG. 1. The homogenizer test machine shown in FIG. 1 was provided with a homogenizer 1, a cylindrical heater for heating 2, a temperature adjuster 3, a thermocouple for oil temperature measurement 4, an electric power source for the heater 5, a glass cylinder corresponding to an oil tank 6 (graduated cylindrical glass vessel, 40 mm in inner diameter, 300 mm in depth, 2 mL grading divisions from 0 to 250 mL), and an air blow tube (air blow rate: 30 mL/min) 7.

To the glass cylinder 6, 150 mL of a sample oil was introduced. The temperature of the sample oil was raised by the cylindrical heater for heating 2 to 120° C. The oil surface level at this time was recorded as a reference oil surface level 8. The oil was stirred with the homogenizer 1, and the difference between the oil surface level after 10 minutes stirring and the reference oil surface level was recorded as the amount of foaming. The results are shown in tables 3 to 4.

(Evaluation of Storage Stability, and Durability Against Centrifugal Effect
(1): Homogenizer Test)
(a) Centrifugation Four glass centrifuge tubes each filled with the sample oil to the 60 mL graduation mark were prepared. These four centrifuge tubes with the sample oil were set in a centrifuge, and rotated at 25° C. at 10,000 rpm for 180 minutes. The relative centrifugal force in this rotation was 8,000 G on average. After the centrifugation, a supernatant (200 mL in total) was recovered.
(b) Homogenizer Test The defoaming performance of the recovered supernatant was evaluated by the homogenizer test same as described above. The results are shown in tables 3 to 4. A less increase of the amount of foaming after the centrifugation means a less tendency to segregate and precipitate the defoaming agent during storage, and means less deterioration of the defoaming performance induced by the centrifugal effect.
(Evaluation of Storage Stability, and Durability Against Centrifugal Effect
(2): Measurement of Silicon Content in Oil)
(a) Measurement of Silicon Content in Fresh Oil Concerning each of the above prepared lubricating oil compositions, the silicon content in the fresh oil was measured by inductively coupled plasma (ICP) atomic emission spectroscopy.
(b) Measurement of Silicon Content in Oil after Centrifugation The prepared lubricating oil compositions were each subjected to centrifugation in the same manner as the above (for 180 minutes at 25° C. at 8,000 G). Concerning the recovered supernatant, the silicon content in the oil was measured by ICP atomic emission spectroscopy in the same manner as the above. A silicon content in the oil after the centrifugation closer to that in the fresh oil means a less tendency to segregate and precipitate the defoaming agent during storage, and means less loss of the defoaming agent induced by the centrifugal effect.

As can be seen from tables 3 to 4, concerning all the lubricant oil compositions each comprising a defoaming agent according to the present invention (examples 1 to 21), not only the fresh oils but also the sample oils after the centrifugation showed good defoaming performance. In each of these lubricating oil compositions according to the present invention, the decrease of the silicon content in the oil was suppressed low even after the centrifugation. In contrast, concerning each of the lubricating oil compositions of comparative examples 1 to 3, which used the defoaming agent not fall under the defoaming agent according to the present invention, the sample oil after the centrifugation showed significantly impaired defoaming performance compared to the fresh oil. Concerning each of the lubricant oil compositions of these comparative examples, the silicon content in the oil significantly decreased after the centrifugation.

The above test results showed that the defoaming agent and the lubricating oil composition according to the present invention can prevent defoaming performance from impairing even during long-term storage, and can keep the deforming performance of the lubricating oil for a long time even under such a lubricating condition that a high centrifugal effect occurs to the lubricating oil.

INDUSTRIAL APPLICABILITY

The defoaming agent and the lubricating oil composition according to the present invention can prevent defoaming performance from impairing even during long-term storage, and can keep the deforming performance of the lubricating oil for a long time even under such a lubricating condition that centrifugal effect occurs to the lubricating oil. Thus, the deforming agent and the lubricating oil composition according to the present invention may be preferably used for any lubricating oil compositions that require defoaming performance, and among them, may be especially preferably used in any lubricating oil used under such a lubricating condition that centrifugal effect occurs to the lubricating oil, for example, in an engine oil for automobiles, a transmission oil for automobiles (that may be electric vehicles), or an automobile transaxle oil.

REFERENCE SIGNS LIST

1 homogenizer
2 cylindrical heater for heating
3 temperature adjuster
4 thermocouple for oil temperature measurement
5 electric power source for the heater
6 glass cylinder corresponding to an oil tank (graduated cylindrical glass vessel, 40 mm in inner diameter, 300 mm in depth, 2 mL grading divisions from 0 to 250 mL)
7 air blow tube (air blow rate: 30 mL/min)
8 reference oil surface level

We claim:

1. A defoaming agent obtainable by a process, the process comprising:
polymerizing (A) at least one polymerizable monomer in a composition, the composition comprising (C) a solvent and (B) at least one non-polymerizable polysiloxane dissolved in the (C) solvent,
wherein the component (A) comprises at least one Si-atom-containing monomer in an amount of no more than 5 mass % on the basis of the total mass of the component (A), and
wherein the component (B) comprises at least one polysiloxane represented by the following formula (2):

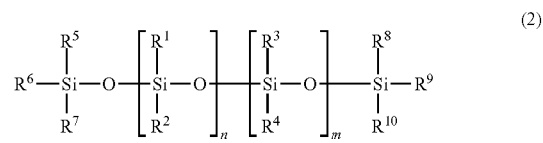

wherein in the general formula (2), polysiloxane repeating units may be in any order;
$R^1$ and $R^2$ are each independently a no-fluorine-atom-containing non-polymerizable C1-18 organic group;

R³ and R⁴ are each independently a fluorine-atom-containing non-polymerizable organic group, or a no-fluorine-atom-containing non-polymerizable C1-18 organic group, wherein at least one of R³ and R⁴ is a non-polymerizable organic group comprising no less than 3 fluorine atoms;

R⁵, R⁶, R⁷, R⁸, R⁹, and R¹⁰ are each independently a non-polymerizable C1-18 organic group;

n and m are each independently an integer of no less than 0;

n+m is no less than 1; and a ratio m/(n+m) is 0 to 1.

2. The defoaming agent according to claim 1, wherein the component (A) does not comprise the Si-atom-containing monomer.

3. The defoaming agent according to claim 1, wherein the component (A) comprises at least one monomer represented by the following general formula (1):

$$Q^1\text{-}Z_1\text{—}Y^1 \qquad (1)$$

wherein in the general formula (1), $Q^1$ is a polymerizable functional group; $Y^1$ is a substituted or unsubstituted C1-40 hydrocarbyl group; and $Z^1$ is a linking group linking $Q^1$ and $Y^1$ or a single bond.

4. The defoaming agent according to claim 1, wherein the component (A) comprises at least one monomer selected from the group consisting of a (meth)acrylate ester, an α-olefin, and styrene.

5. The defoaming agent according to claim 1, wherein the component (A) further comprises at least one multifunctional monomer having at least two polymerizable functional groups in a single molecule.

6. The defoaming agent according to claim 1, wherein in the general formula (2), R¹ and R² are each independently a no-fluorine-atom-containing C1-6 saturated hydrocarbyl group, or a no-fluorine-atom-containing C6-10 aromatic hydrocarbyl group which may comprise one or more alkyl substituent;

R³ and R⁴ are each independently a fluorine-atom-containing non-polymerizable organic group, a no-fluorine-atom-containing C1-6 saturated hydrocarbyl group, or a no-fluorine-atom-containing C6-10 aromatic hydrocarbyl group which may comprise one or more alkyl substituent, wherein at least one of R³ and R⁴ is a non-polymerizable organic group comprising no less than 3 fluorine atoms; and R⁵, R⁶, R⁷, R⁸, R⁹, and R¹⁰ are each independently a C1-6 saturated hydrocarbyl group, or a no-fluorine-atom-containing C6-10 aromatic hydrocarbyl group which may comprise one or more alkyl substituent.

7. The defoaming agent according to claim 1, wherein in the general formula (2), R¹ and R² are each independently a no-fluorine-atom-containing C1-3 alkyl group, or phenyl group;

R³ and R⁴ are each independently a fluorine-atom-containing non-polymerizable organic group, or a no-fluorine-atom-containing C1-3 alkyl group, or phenyl group, wherein at least one of R³ and R⁴ is a non-polymerizable organic group comprising no less than 3 fluorine atoms; and R⁵, R⁶, R⁷, R⁸, R⁹, and R¹⁰ are each independently a C1-3 alkyl group, or phenyl group.

8. The defoaming agent according to claim 1, wherein the component (B) has a weight average molecular weight of 5,000 to 500,000.

9. A lubricating oil composition comprising:
a lubricant base oil; and
the defoaming agent as defined in claim 1.

* * * * *

UNITED STATES PATENT AND TRADEMARK OFFICE
CERTIFICATE OF CORRECTION

| | | |
|---|---|---|
| PATENT NO. | : 12,060,536 B2 | Page 1 of 1 |
| APPLICATION NO. | : 17/922870 | |
| DATED | : August 13, 2024 | |
| INVENTOR(S) | : A. Takagi et al. | |

It is certified that error appears in the above-identified patent and that said Letters Patent is hereby corrected as shown below:

In the Claims

Column 35, Line 19 (Claim 3, Line 4), please change "$Z_1$" to -- $Z^1$ --.

Signed and Sealed this
Fourth Day of February, 2025

Coke Morgan Stewart
*Acting Director of the United States Patent and Trademark Office*